United States Patent
Hagersten et al.

(10) Patent No.: US 10,713,166 B2
(45) Date of Patent: Jul. 14, 2020

(54) EFFICIENT EARLY ORDERING MECHANISM

(71) Applicant: Samsung Electronics Co., Ltd., Suwon-si, Gyeonggi-do (KR)

(72) Inventors: Erik Hagersten, Uppsala (SE); Andreas Sembrant, Uppsala (SE)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/968,905

(22) Filed: May 2, 2018

(65) Prior Publication Data

US 2018/0322053 A1 Nov. 8, 2018

Related U.S. Application Data

(60) Provisional application No. 62/502,008, filed on May 5, 2017.

(51) Int. Cl.
*G06F 12/0811* (2016.01)
*G06F 12/0897* (2016.01)

(52) U.S. Cl.
CPC ...... *G06F 12/0811* (2013.01); *G06F 12/0897* (2013.01); *G06F 2212/1008* (2013.01); *G06F 2212/60* (2013.01); *G06F 2212/608* (2013.01)

(58) Field of Classification Search
CPC ............. G06F 12/0811; G06F 12/084; G06F 12/0893; G06F 12/0897; G06F 15/17331; G06F 2212/1008; G06F 2212/60; G06F 2212/608
See application file for complete search history.

(56) References Cited

U.S. PATENT DOCUMENTS

| 2015/0347297 A1 | 12/2015 | Hagersten et al. |
| 2016/0182245 A1* | 6/2016 | Chen ................. H04L 12/1886 370/236 |

OTHER PUBLICATIONS

Extended European Search Report for corresponding European Patent Application No. 18170614.4 dated Sep. 26, 2018.

* cited by examiner

*Primary Examiner* — Larry T Mackall
(74) *Attorney, Agent, or Firm* — Harness, Dickey & Pierce, P.L.C.

(57) ABSTRACT

Data units are stored in private caches in nodes of a multiprocessor system, each node containing at least one processor (CPU), at least one cache private to the node and at least one cache location buffer (CLB) private to the node. In each CLB location information values are stored, each location information value indicating a location associated with a respective data unit, wherein each location information value stored in a given CLB indicates the location to be either a location within the private cache disposed in the same node as the given CLB, to be a location in one of the other nodes, or to be a location in a main memory. Coherence of values of the data units is maintained using a cache coherence protocol. The location information values stored in the CLBs are updated by the cache coherence protocol in accordance with movements of their respective data units.

20 Claims, 15 Drawing Sheets

(*) Outstanding ReadReq need to complete before a node sends an Ack (*) Outstanding ReadReqCM do not need to complete before a sending an Ack (*) Outstanding ReadReqCM do not need to complete before a sending an Ack
(**) Wait until all the node's outstanding ReadReq for this data unit have completed (*) Do not send ACK until all outstanding ReadReqs have been completed
(**) Requestor may receive read requests for the data unit before Ack have been received (*) Do not send ACK unit all outstanding ReadReqs have been completed

EFFICIENT EARLY ORDERING MECHANISM

This application claims priority under 35 U.S.C. § 119 to U.S. application No. 62/502,008 filed on May 5, 2017. The entire disclosure of the above-referenced application is hereby incorporated by reference.

TECHNICAL FIELD

Embodiments of the subject matter disclosed herein generally relate to methods and systems for accessing data in computer memory devices and, more particularly, to mechanisms and techniques for implementing a coherent cache hierarchy.

BACKGROUND

Today's processors are often equipped with caches that can store copies of the data and instructions stored in some high-capacity memory. A popular example today of such high-capacity memory is dynamic random access memory (DRAM). Herein, the term "memory" will be used to collectively refer to all existing and future memory implementations. Cache memories, or "caches" for short, are typically built from much smaller and much faster memory than other memory implementations and can subsequently only hold copies of a fraction of the data stored in main memories or secondary storage devices at any given time. Today, caches are often implemented using SRAM and large caches can be implemented using DRAM. The caches described herein can be implemented using any existing and future memory technology.

Often, the memory system of a computer system includes a range of caches, with larger and slower caches (here referred to as higher-level caches) close to the main memory and smaller and faster caches (here referred to as lower-level caches) closer to the processor. This configuration is typically referred to as a cache hierarchy, memory hierarchy or memory system. Each level in the cache hierarchy is referred to as a cache level. FIG. 1 depicts a computer system, where each CPU 101 is assigned its own first-level private cache 102 (L1 cache). A private cache is a cache where space for a data unit can only be in response to an activity of a CPU local to the cache (or a CPU in the same node as the cache, where the cache is private to that node). In this example, the second-level cache 103 is shared by all the CPUs 101 and may contain data and instructions that are accessed by all of the CPUs 101. Cache 103 is a global cache, since space for a data unit can be made in response to activities of any CPU 101. Furthermore, cache 103 is a shared cache, since each data unit can only exist in one shared copy (while each private cache can have its own replicated copy). Memory 105 also stores instructions and data that are accessed by all CPUs 101. The (main) memory 105 is typically accessed using a physical address, or PA for short, while the addresses generated by a CPU 101 are typically virtual addresses. Computer systems with several CPUs and several private caches, such as the system shown in FIG. 1, need efficient mechanisms for finding a requested data unit in one of the caches as well as for keeping the multiple copies of a datum stored in different nodes coherent.

Such computer systems will also typically include one or more secondary storage devices in addition to main memory and cache memory. These secondary storage devices can include one or more of hard drives, optical drives, flash drives or the like, which are collectively represented here by disk 104. The disk or secondary storage 104 may store several orders of magnitude more data than the memory 105, but is not directly accessible using a physical address. If a CPU 101 wants to access data stored on the disk 104, a virtual memory system (not shown in FIG. 1) moves a chunk of data, typically referred to as a page, from the disk 104 to the memory 105 and creates a translation from virtual addresses corresponding to that page to physical addresses. A special kind of translation cache (not shown in FIG. 1), typically called a "translation look-aside buffer" or TLB for short, caches the translation mappings from virtual pages to physical pages. The virtual memory system can be viewed as a caching system, which stores a portion of the data located in the disk 104 in the memory 105.

FIG. 2 shows a more detailed view of the cache organization from FIG. 1, where the CPU 204 is shown to contain several cache-like structures, such as the Instruction TLB (ITLB, 201) and Data TLB (DTLDB, 205), and a CPU core 202. The level 1 cache 102 is shown as including an instruction cache 200 and a data cache 206, interposed between the CPU 204 and the level 2 (and potentially higher level) caches 207. FIG. 2 also shows a high-capacity memory 208 connected to the cache hierarchy.

When a CPU 204 requests data that is present in the cache, referred to as a cache hit, that request can be serviced much faster than an access to data that is not present in the cache, referred to as a cache miss. Typically, an application running on the CPU 204 that experiences fewer cache misses will execute more quickly and consume less energy than if the same application which suffers from more cache misses, assuming that the two versions of the application otherwise have similar properties. Therefore, considerable effort has been invested in techniques for avoiding cache misses, and also to design implementations that can make cache hits and cache misses efficient with respect to both their access latency and the energy that these memory transactions consume.

In order to understand how to develop solutions to this cache hit/miss problem, some understanding of cache organization and terminology will be useful. Typically, data are installed into caches in fixed chunks that are larger than the word size of a processor, known as cachelines. Common cacheline sizes today are, for example, 32, 64 and 128 bytes, but as will be appreciated by those skilled in the art both larger and smaller cacheline sizes exist for various cache implementations. The cacheline size may also be variable for some cache implementations.

A common way to organize the data placement in memory 208 is in a manner that each data word is statically mapped to reside in one specific cacheline. Each cache typically has an index function that identifies a portion of the cache where each cacheline can reside, known as a set. The set may contain space to hold one or more cachelines at the same time. The number of cachelines which the set can hold is referred to as its associativity. Often, the associativity for all of the sets in a cache is the same. Such caches are often referred to as set-associative caches. The associativity may also vary between the sets. Each of the spaces in a set that can hold a cacheline is referred to as a way.

In order to determine the identity of each cacheline stored in each set, cachelines in a cache each have some identifier associated with them. One common example of such an identifier is an address tag. When looking for a specific cacheline in a cache, its address may be used to determine the set of the cache where it may reside. The address tags of the cachelines of the corresponding set are compared to a tag portion of the address used to identify a cacheline (see, e.g., TAG and ATAG depicted in FIG. 3 and described below) to determine if the desired cacheline resides in the cache, and if so, in which way it resides, i.e., in which of the spaces in a set that can hold a cacheline it resides.

Often, each cache has built-in strategies to determine which cacheline to keep in the set and which cacheline to evict (also referred to as replace) to make space for a new cacheline being brought into the set, referred to as its replacement policy. The replaced cacheline is known as a victim or a replaced cacheline. Popular replacement policies used in conjunction with cache memories include, but are not limited to, least-recently used (LRU), pseudo-LRU and random replacement policies.

So-called inclusive cache hierarchies require that a copy of a block of data (for example a cacheline) present in one cache level, for example a block of data in the L1 cache, also exists in the higher cache levels (here, higher refers to cache levels with higher numbers than 1), for example in the L2 and L3 cache. Exclusive cache hierarchies only have one copy of the block of data (for example a cacheline) existing in the entire cache hierarchy, while non-inclusive hierarchies can have a mixture of both strategies. In exclusive and non-inclusive cache hierarchies, it is common that a cacheline is installed in the next higher cache level upon eviction from a given cache level.

With this background on caches and cachelines in mind, this discussion now proceeds to illustrate one conventional technique for identifying specific cache locations within a cache hierarchy like that shown in FIGS. 1 and 2. FIG. 3 shows an example of the organization of a computer system node containing a CPU 301, a DTLB 303, an L1 CACHE 307 and an L2 CACHE 311. The CPU 301 generates a memory request containing a virtual address 302 (VADDR), which is used to perform an associative lookup in the DTLB 303. The virtual address 302 is in this example divided into three parts: P-OFFSET (page offset, for example consisting of the low-level bits), TAG and INDEX. The INDEX portion of the virtual address 302 is used to identify the set within the DTLB 303 where the address translation may be stored.

The illustrated DTLB 303 used in this example has a two-way associative organization, showing two entries of the identified set. Each entry consists of an address tag (ATAG) 304, and physical page frame (PPF) 305. The TAG portion of the virtual address 302 is compared with the ATAGs 304 of each entry of the identified set. The logic 318 determines if there is match for any of the entries, and, if so, controls the MUX 306 to select the corresponding PPF 305. A physical address PADDR 316 is composed by concatenating the PPF 305 selected by MUX 306 with the P-OFFSET portion of the virtual address 302. Alternatively, if neither of the entries of the identified set match the TAG portion of the virtual address 302, then a TLB fill operation is performed and the needed translation entry is brought into the DTLB 303.

The PADDR 316 is used to perform a lookup in the L1 CACHE 307. More specifically, an INDEX portion of the PADDR 316 is used to identify the set where the cacheline containing the requested data may be stored. (It should be noted that this L1 INDEX may contain different bits than the DTLB INDEX). The depicted L1 CACHE 307 has a 2-way associative organization with two entries in the identified set. Each entry consists of an address tag (ATAG) 308, and data 309 of the corresponding cacheline. A TAG portion of the PADDR 316 is compared with the ATAGs of each entry of the identified set. The logic 319 determines if there is match for any of the entries, and controls the MUX 310 to select the corresponding data. If neither of the entries matches (depicted by L1 MISS 317) a lookup in the L2 CACHE 311 is needed. While the division of PADDR 316 into INDEX and TAG portions for the L2 CACHE lookup may differ from the division done for the L1 CACHE lookup, the remaining steps for the L2 CACHE lookup are typically similar to those performed for the lookup in the L1 CACHE. If a miss in the L2 CACHE is determined, new lookups in higher-level caches or accesses to memory may be needed. It can be noted that if the INDEX portion of PADDR 316 used by the L1 cache is entirely composed by P_OFFSET bits, the access to the L1 cache 307 can be started before the PPF information coming from the MUX 306 is available. This is often referred to as a virtually indexed, physically tagged cache (VIPT).

It would be appreciated by someone skilled in the art that several "nodes", each with a memory hierarchy similar to the one depicted in FIG. 3, can be connected together to form a coherent multiprocessor system. Another example of a multiprocessor is shown in FIG. 1, where each CPU has its own private L1 cache. This further complicates the task of locating where a requested data resides since it is no longer sufficient to always search for the data in the next higher cache level. Mechanisms for searching caches of the other nodes as well as for keeping the multiple copies of a datum stored in different nodes coherent are needed.

To summarize the discussion associated with FIG. 3, it will be appreciated by those skilled in the art that contemporary implementations of a cache hierarchy may require many associative lookups to be performed in TLBs as well as at different cache levels before the location of a requested cacheline can be determined. Furthermore, each translation entry and cached cacheline needs to be accompanied by an address tag and a plurality of these tags need to be compared with a portion of an address at each of these levels. Overall, this implementation comes at an enormous cost in terms of the dynamic energy used for each associative lookup. It also requires substantial overhead in static energy and memory capacity to store the extra tag information that is needed to perform the comparisons. Furthermore, multiprocessors containing several CPUs or several nodes, each with their own private cache hierarchies require additional costly search mechanisms for locating data residing in the private caches as well as the need for costly coherence activities to keep replicated copies of the same date in the private cache coherent.

Accordingly, it would be desirable to provide systems and methods that avoid the afore-described problems and drawbacks associated with cache lookups for data.

SUMMARY

Systems and Methods for Implementing Coherent Memory Based on Locality Information According to an embodiment, data units are stored in private caches in nodes of a multiprocessor system, each node containing at least one processor (CPU), at least one cache private to the node and at least one cache location buffer (CLB) private to the node. In each CLB location information values are stored, each location information value indicating a location associated with a respective data unit, wherein each location information value stored in a given CLB indicates the location to be either a location within the private cache disposed in the same node as the given CLB, to be a location in one of the other nodes, or to be a location in a main memory. Coherence of values of the data units is maintained using a cache coherence protocol. The location information values stored in the CLBs are updated by the cache coherence protocol in accordance with movements of their respective data units.

According to an embodiment, a system for implementing the above-described method is contemplated and described below.

Systems and Methods for Implementing Coherent Memory Promoting Global Caches Nearby According to an embodiment, a method stores data units in private caches in nodes of a multiprocessor system and in global caches and a memory, wherein each node contains at least one processor (CPU), at least one cache private to the node. Coherency of values of the data units stored in the private and global caches are maintained using a cache coherence protocol which performs lookups in a directory storing locality information for the data units. The location information identifies a location where the data unit resides as being one of: a node, a global cache or memory.

According to an embodiment, a system for implementing the above-described method is contemplated and described below.

Systems and Methods for Implementing Coherent Memory Through Blocking Coherence

According to an embodiment, data units are stored in private caches in nodes of a multiprocessor system and in global caches and a memory, wherein each node contains at least one processor (CPU), at least one cache private to the node. The nodes are connected via a network. The coherence of values of data units stored in the caches is maintained by a distributed cache coherence protocol which sends coherence messages on the network. Some coherence messages are blocked from being sent on the network. A coherence message which is sent activates the blocking function to block other coherence messages if the other coherence messages are for the same address region as the coherence message.

According to an embodiment, a system for implementing the above-described method is contemplated and described below.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
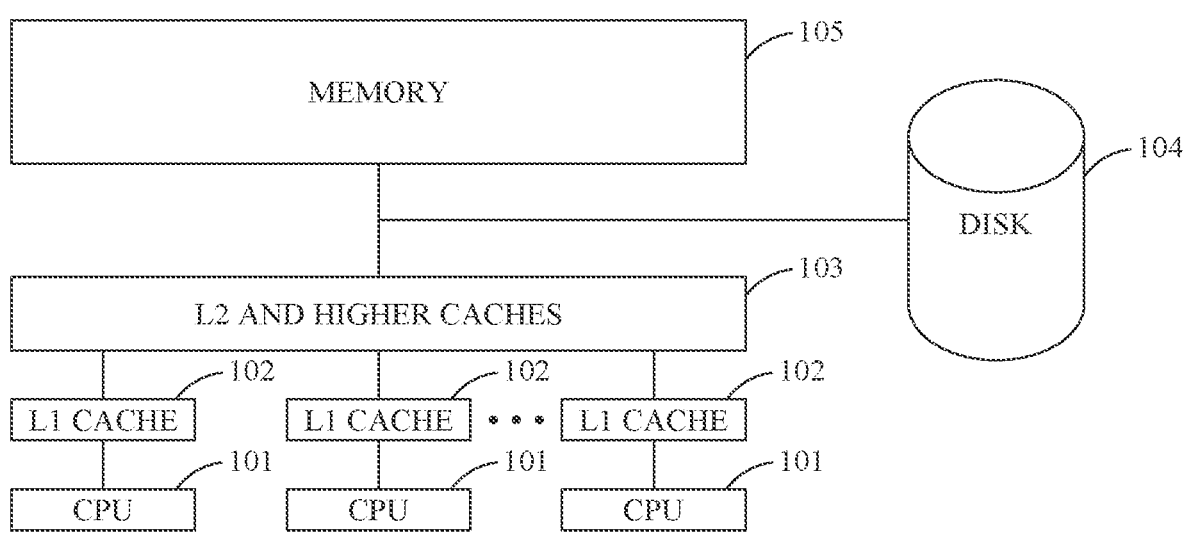
FIG. 1 is a block diagram of a multi-processor system.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of particular cache hierarchies and methods for performing lookups in such hierarchies. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In the following description numerous details provide a thorough understanding of the embodiments. These details include functional blocks and an exemplary cache location buffer CLB for implementing an efficient alternative to traditional cache tagging schemes. In addition, while the CLB scheme of the embodiments is described with reference to specific caches and computer architectures, the embodiments are applicable to a wide range of memory and system architectures. In other instances, well-known circuits and structures are not described in detail so as not to obscure the embodiments unnecessarily.

According to various embodiments described herein, methods and systems provide for, among other things, cache handling schemes (CHS) which explicitly store location information (LI). The LI is leveraged for efficiently accessing a multi-way cache of a computer system having a main memory and one or more processors. The CHS tracks the contents of the so-called cache hierarchy, but due to the nature of some features described herein the topology of the memory system do not necessarily need to be a hierarchy. The tracking is performed by a cache location buffer (CLB) or some hierarchy of CLBs. The caches include a plurality of cache lines divided into a number of segments corresponding to the number of ways.

In accordance with the embodiments, instead of discarding useful location information, which is known every time a cache line is moved between the levels in the hierarchy and between the nodes, the location information is stored (e.g., updated) in the CHS and utilized for later cache access. The CLB is organized in an associative way. Accordingly, each CLB entry includes an address tag field and a plurality of LIs associated with the address tag field, although other techniques for storing the location information are possible according to other embodiments. Subsequently, the location information stored in the CLB can be used to quickly access the location of the requested data without the need for additional associative lookups. More precisely, the CLB provides location information LI from which the right cache identity, as well as the right location within the cache, can be determined without the need to access any address tags of the cache. LI may also identify a remote node as the location for the associated data. Thus, using techniques in accordance with these embodiments, requested data can be found more quickly in the cache hierarchy, and in a manner which consumes less energy. The techniques described also enable more flexible and less hierarchical cache topologies to be efficiently implemented.

For a cache hierarchy consisting of set-associative cache with the same associativity, the number of bits in each LI is dependent on the number of ways, the number of different caches and the number of nodes covered by the CLB. Some LI values can be reserved to store certain patterns with certain hard-coded meanings. For example, one LI value can be reserved for a memory pattern, implying that the data is not in the part of the memory hierarchy covered by CHS. In one implementation, the number of LI bit(s) is equal to the log base 2 of the number of way(s) plus the number of caches covered by the CLB plus one (i.e., log 2(way+levels+1)), assuming that the number of nodes is smaller than the number of caches identified times the number of ways. If the number of ways of the different cache levels varies, or if caches other than set-associative caches are used, those skilled in the art will appreciate that other LI representations are possible.

Access of the cache via the CLB by the CHS can, for example, be generally performed as follows according to an embodiment. Upon receiving an address of a target cache line, the CLB attempts to match an address field of one of the cache location entries (CLE) which it has stored therein with a TAG portion of the address. If there is a match, a LI of the CLB entry is retrieved using a LI-offset portion of the address. The CHS indexes directly into a single cache line of the cache using the LI value, and an index part of an address. Thus, the cache does not need to store any address tag information.

Figure 2:
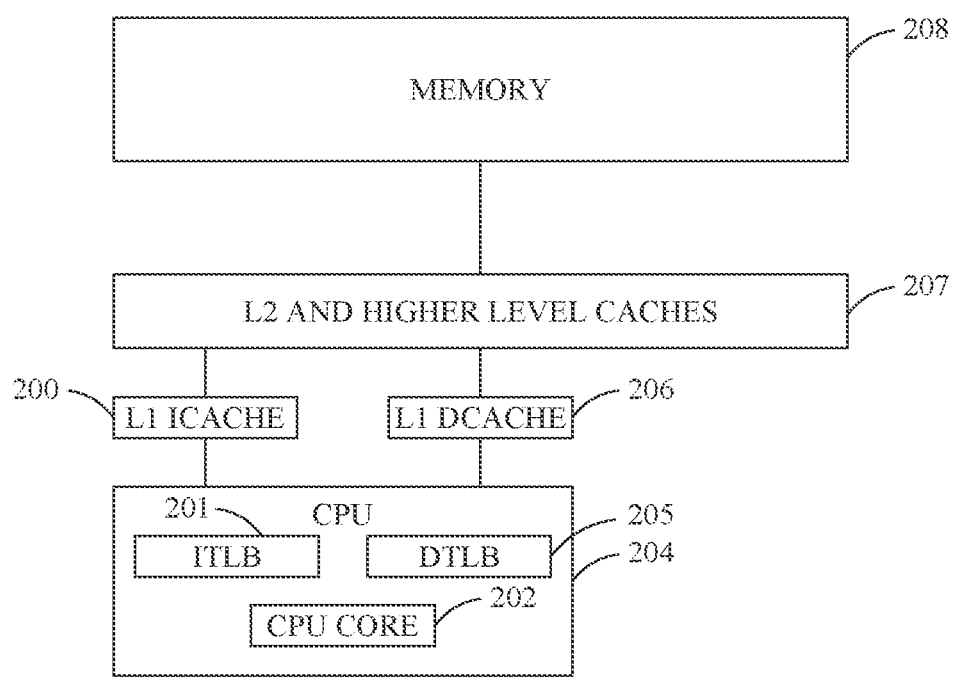
FIG. 2 is a block diagram of a uni-processor system cache hierarchy.
Figure 3:
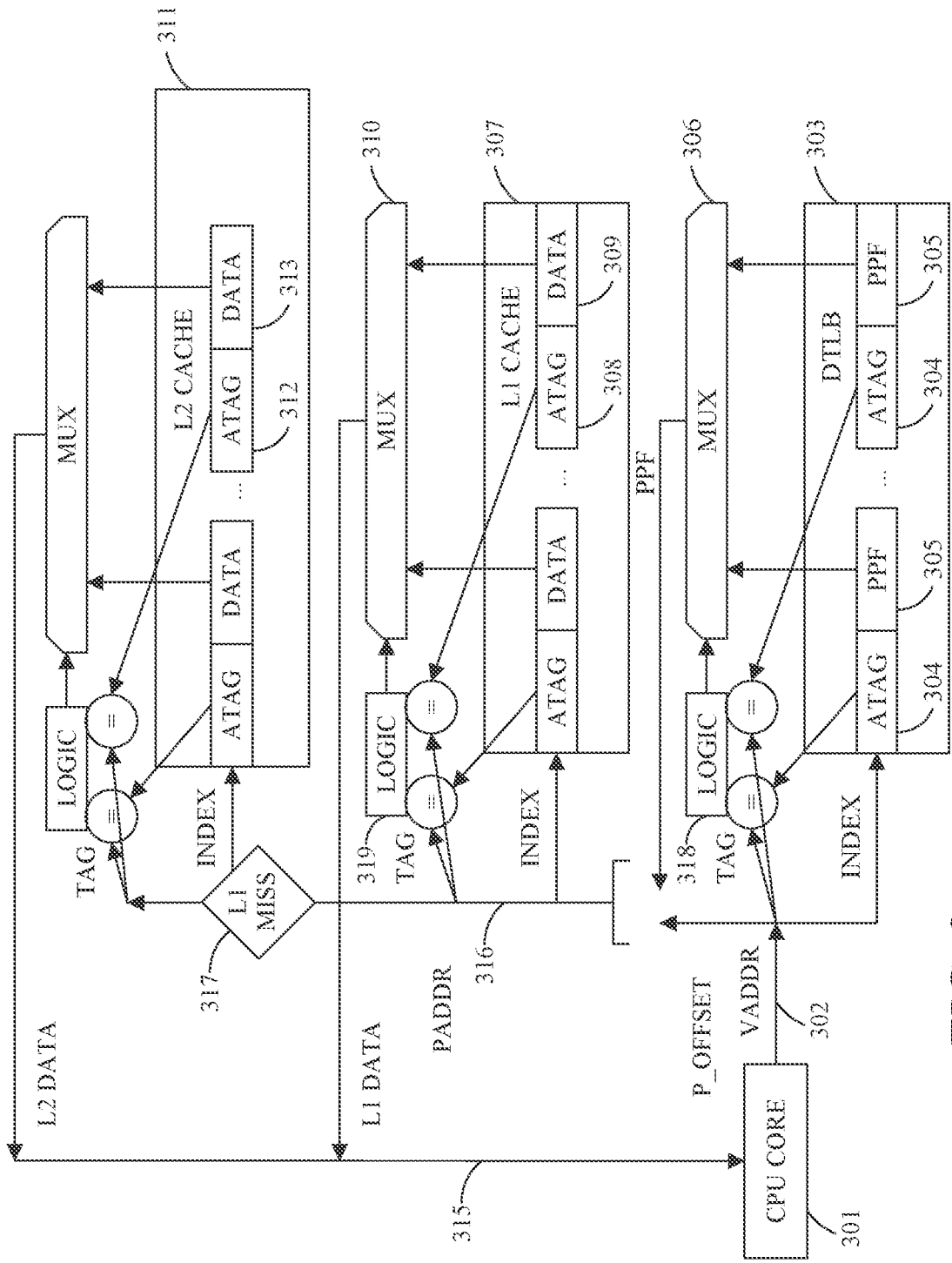
FIG. 3 illustrates a conventional implementation of a two-level cache hierarchy consisting of set-associative caches and a set-associative data translation look-aside buffer.

Thus, in accordance with the embodiments, systems such as those illustrated in FIG. 1 and FIG. 2, can also include a cache handling scheme (CHS) as described herein. That scheme includes a cache location buffer (CLB), or a hierarchy of CLBs, that keep track of the location of data units stored in a cache hierarchy. Whenever a data unit is moved in the cache hierarchy, its new location is recorded in the CLB.

The CLB according to such embodiments may be implemented as an associative organization, storing a plurality of cache location entries (CLE). Each CLE contains an address tag, used for the associative lookup, and some payload, for example a cache location table (CLT), storing a plurality of location information (LI). Actually, the CLB itself can be viewed as a cache storing location information.

To illustrate these, and other features, of various embodiments, such embodiments will now be described with respect to FIGS. 4-15. For clarity, those skilled in the art will appreciate that these Figures illustrate logical implementations of the embodiments rather than actual physical implementations. Those skilled in the art will thus understand that these diagrams show logical representations of implementations and that physical implementations may differ substantially in their implementation details.

In one embodiment, the data units being tracked correspond to cachelines and the cache that stores those data units is organized in a set-associative manner.

Figure 4:
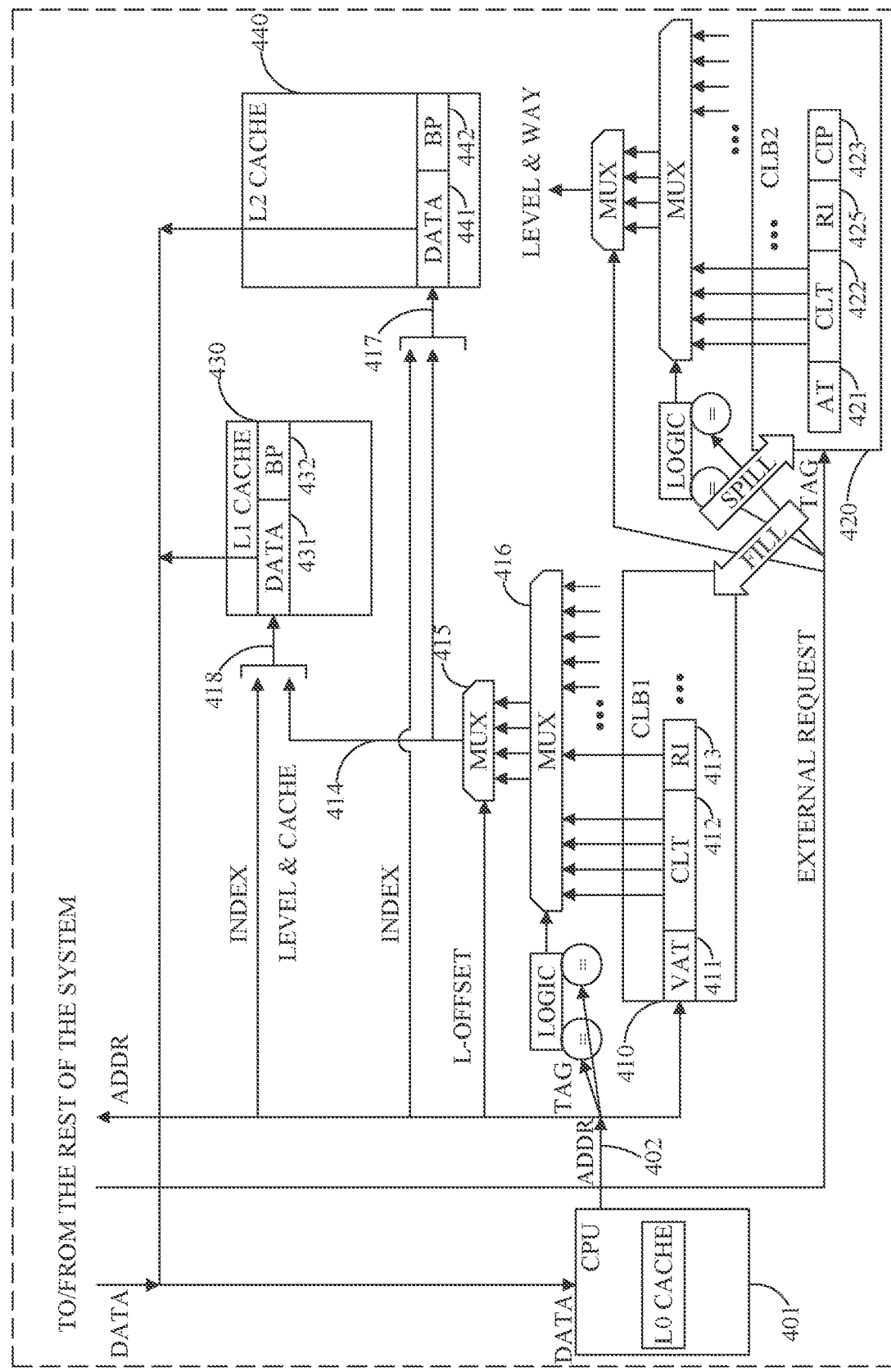
FIG. 4 is a block diagram illustrating an embodiment including a two-level cache hierarchy and a two-level CLB hierarchy, where the first level is virtually accessed and the second level is physically accessed.

In one embodiment, the location information (LI) corresponding to a requested cacheline of a matching CLE can indicate in which cache the requested cacheline resides. This will cause embodiments to perform a direct cache lookup at the appropriate cache. For example, in the system (which may be a node in a multiprocessor system) shown in FIG. 4, the location information can distinguish between L1 CACHE and L2 CACHE. It may also be able to distinguish between other caches present in the rest of the multiprocessor system, not shown in this Figure. FIG. 4 shows a tag-less node, that may be connected to other nodes in a multiprocessor system, with a two-level cache hierarchy of set-associative caches and a CPU (which may contain one or many traditional caches, here depicted L0), where CPU 401 generates addresses (ADDR) 402. FIG. 4 also shows a two-level CLB hierarchy of set-associative CLBs, where CLB1 410 and CLB2 420 are indexed with ADDR. Each entry in CLB1 consists of at least an address tag (AT) 411, a cache location table (CLT) 412. It may store additional information, such as region information (RI) 413. The CLT stores location information (LI) for the cachelines of a corresponding region (also referred to as a micropage). FIG. 4 shows four LI per region as an example. Empirical studies by the inventors shown that 8 to 16 LI per region (i.e., 8 to 16 data units (cachelines) per region) to be cost-effective and efficient. The location information encodes the location where the corresponding cacheline can be found within a multiprocessor system. The location information may, for example, contain the identity of a cache where the data unit can be found. The location information may also contain a location within that cache where the data unit can be found. Alternatively, the location information may contain the identity of a node where the data unit can found or contain some symbol that provides information about its location, for example the symbol "MEM" indicates that the data unit can be found in memory. In one embodiment, the symbol "don't know" indicates that the location of the corresponding data unit is not recorded in the CLT corresponding to the region.

MUX 416 selects the CLT with an AT 411 matching a TAG portion of the ADDR 402 and a MUX 415 selects the LI 414 corresponding to the requested cacheline based on the LI-OFFSET portion of ADDR 402. If the cache identity stored in the selected LI corresponds to the L2 cache 440, an address 417 for accessing the requested data unit in L2 CACHE 440 is formed using an INDEX portion of the address 402 and a portion of the location information 414. In the example of a set-associative L2 CACHE 440, that portion contains information corresponding to the associative way where the requested data unit is stored. If the cache identity stored in the selected LI corresponds to the L1 cache 430, an address 418 for accessing the requested data unit in L1 CACHE 430 is formed in a similar way.

FIG. 4 shows an embodiment where each entry in the L1 cache 430 and L2 cache 440 to have a backwards pointer (BP), 432 and 442 respectively, associated with its cacheline. (DATA), 431 and 441 respectively. In this example, the BP pointers point to their respective associated CLE in CLB2 420. Each CLE in CLB2 420 contains an address tag (AT) 421, a CLT 422 and a CLB1 Pointer (C1P) 423. If the CLB2 entry has a corresponding CLT residing the CLB1 410, its C1P will point to that entry. In that case CLB1 410 will contain the up-to-date information for this region. In that case, the CLE in CLB1 is said to be the active CLB entry, while the CLB entry for the region in CLB2 420 contains a passive entry. In one embodiment, CLB2 420 is required to contain a passive entry for a region if CLB1 410 contains an active entry for the region.

In one embodiment, when no matching CLE can be found in CLB1 410, a corresponding CLE is looked for in CLB2 420 and copied to CLB1, while an old entry in CLB1 copied to CLB2 420, this is referred to as spill and fill or simply spill/fill (SPILL and FILL in FIG. 4). A spill is also for example performed when a traditional inclusive cache evicts a data unit to the next level to make space for a new data unit, which may be brought in (fill) from the next cache level. A similar spill/fill activity will be performed between the different CLB levels, where CLB entries are moved between the CLB levels, since the CLB levels forms an inclusive hierarchy. In one embodiment, a directory DIR is at the root of the CLB hierarchy and spill/fill with the highest level CLBs.

It is possible to initiate access to the requested data unit in parallel with the spill/fill activity.

In one embodiment, the contents of the CLBs of a multi-level CLB implementation are kept consistent with the locations of the data units of the multi-level cache system they manage. A data unit that is moved in the cache hierarchy, including but not limited to movements caused by requests for the data unit from the CPU, evictions of the data unit, prefetching activities and coherence activities, cause an update to its corresponding location information in one or many of the CLBs. For example, in FIG. 4, evicting a data unit 441 from cache 440 can involve the steps of following its associated BP 442 pointer to find its corresponding CLE (which in this example is in the CLB2 420) and updating its corresponding location information to point to the data unit's new location (e.g., storing the MEM symbol). And, if the C1P pointer of the corresponding CLB2's CLE is valid, following the C1P to find its corresponding CLE in the CLB1 410 and updating its location information associated with the cacheline. In one embodiment, the entry in the CLB2 is not updated if there is a valid C1P pointer. In one embodiment, only active CLTs are updated.

As will be appreciated from the foregoing, using tag-less cache systems according to these embodiments, i.e., cache systems where the data unit stored in a caches does not have an address tag associated with it, will result in a number of different types of transactions which will occur when various cachelines located in different storage devices are requested by a CPU 401. The node depicted in FIG. 4 may be a subsystem (or node) of a larger multiprocessor system comprised from several such cache nodes. Keeping the data of the caches in the many nodes coherent requires a cache coherence protocol, for example implementing either snooping or directory-based coherence. The coherence protocol will send coherence requests to the depicted node in FIG. 4 (EXTERNAL REQUESTS). These requests will typically first turn to CLB2 420, which may determine that this cache system does not have the requested cacheline (CLB2 miss or a CLB2 hit to an entry with an inactive C1P and the location information of the requested cacheline holding the value memory pattern). If so, no further action is needed with respect to the data caches L1 and L2 (known as coherence filtering), but the corresponding LI in the active CLT may nevertheless need to be updated to track a new location associated with the data unit. Otherwise, the CLB2 lookup may provide the requested location information (CLB2 hit and the location information of the requested cacheline holding storing the location of the cacheline), or it may determine that CLB1 410 stores the associated location information (CLB2 hit and a valid C1P). In the latter case, a lookup in CLB1 410 is needed to determine either the location of the requested cacheline or that the cacheline does not reside in this cache sub-system. (The corresponding location information in CLB1 contains a memory pattern). Depending on the nature of the coherence request, for example an invalidation request, a read request, or an exclusive read request, the coherence protocol will perform some operations on the requested data unit and possibly change its state. The corresponding LI in the active CLT may also need to be updated to track a new location associated with the data unit.

Even though the node shown in FIG. 4 consists of two cache levels, someone skilled in the art would understand that nodes can be assembled using other number of levels and may contain more than one CPU. Furthermore, the number of cache levels and the number of CLB levels in a node do not need to be identical.

Figure 5:
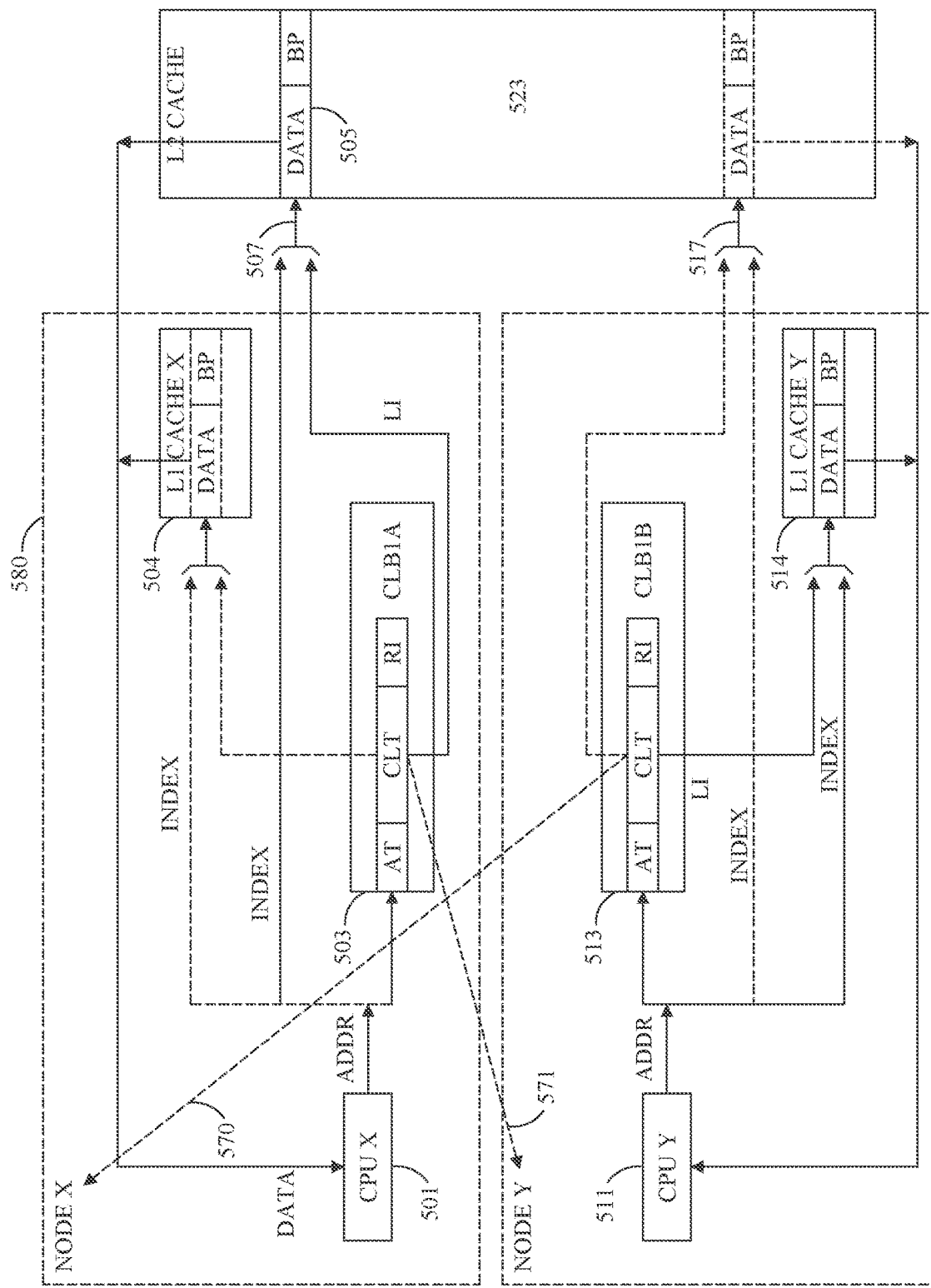
FIG. 5 is a block diagram illustrating an embodiment including two CPUs connected to a two-level cache hierarchy and a two-level CLB hierarchy.

The embodiments can also be applied on systems with several CPUs sharing a cache managed by the CLBs. For example, FIG. 5 shows a system built from two CPU nodes (580 and 590), each within their own one-level cache hierarchy with one CLB1 (503 and 513) and a private cache L1 CACHE (504 and 514) according to an embodiment. The system also contains a global shared L2 CACHE 523 (sometimes referred to as a last-level cache LLC), which is shared between the two CPUs 501, 511.

A lookup in a CLB1 (513 or 503) selects a single LI based on an address generated by their respective CPUs (501, 511), for example using techniques similar to CLB1 410. As indicated by the three arrow initiated by the two shown CLT entries in CLB1A 503 and CLB1B 513, the selected LI may identify the location to be either in the corresponding L1 cache (504 and 514 respectively), in the L2 cache 523 or in the other node (showed by 570 and 571 respectively). In this example, CLB1A 503 identified its accessed data to be 505 in the shared L2 523, while CLB1A 503 identified its accessed data to be 505 in its L1 514 (show by the solid arrows).

Figure 6:
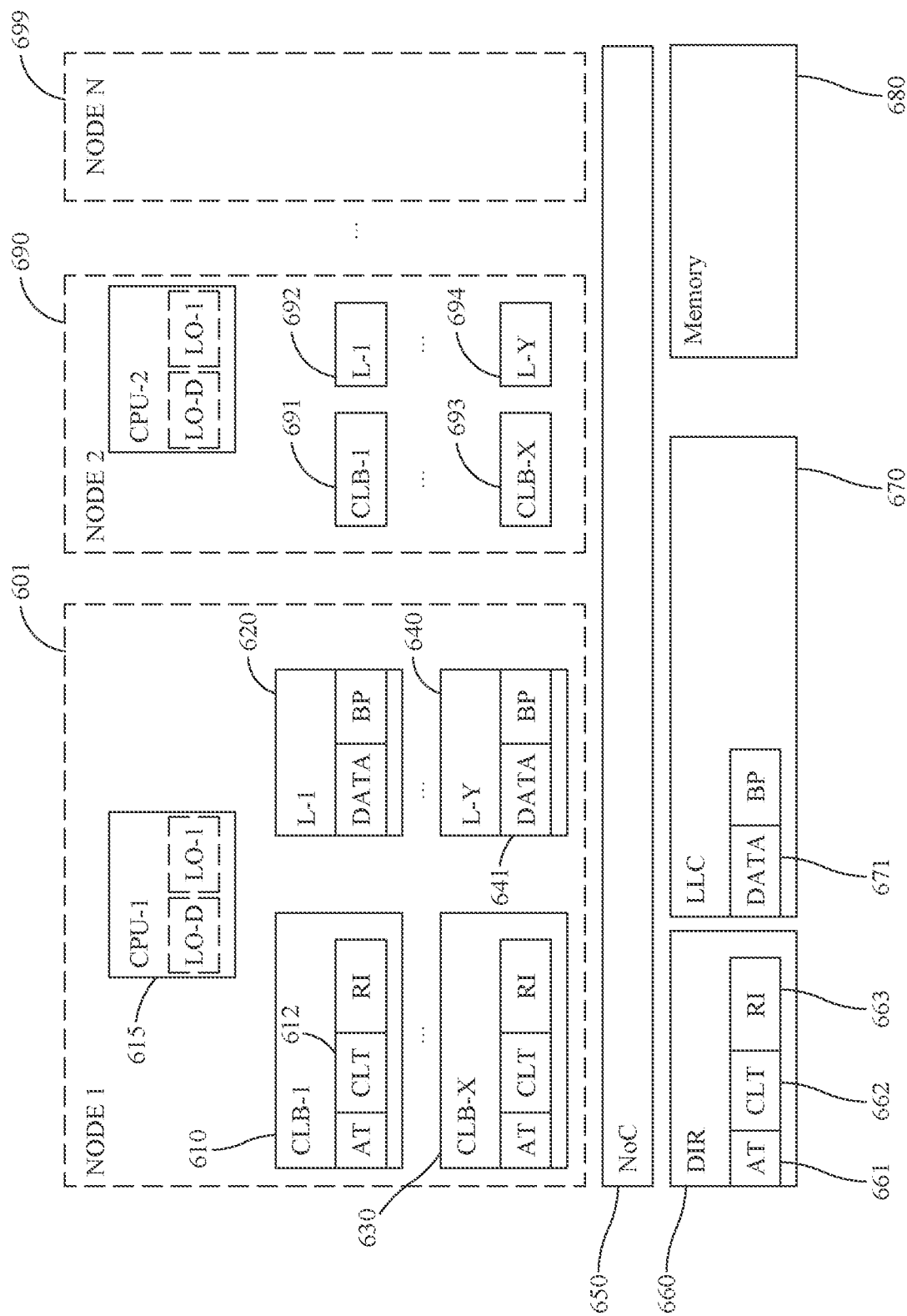
FIG. 6 is a block diagram illustrating a generalized tag-less cache hierarchy with a single monolithic last level cache according to an embodiment.

FIG. 6 shows a generalized picture of a tag-less multi-processor memory system. This example consists of N nodes, ranging from Node-1 601 to Node-N 699. Each node has X levels of CLBs and Y levels of private caches, i.e., caches private to the node. The nodes are connected together with each other through a network on chip (NoC) 650 circuit. NoC 650 also connects the nodes to the directory (DIR) 660, the global last level cache (LLC) 670 and memory 680. DIR 660 is organized similarly to CLBs and has entries that consist of at least an address tag (AT) 661 and a cache location table (CLT) 662. An entry may also contain additional information, such as region information (RI) 663, which is described in more detail below. The highest level CLBs in the nodes (CLB-X 630, 693) spill/fill to/from DIR. DIR also plays a central role in the coherence protocol that keep the contents of the caches and the CLBs coherent and consistent.

The CLBs and DIR can be viewed to form one inclusive "cache hierarchy", caching metadata with information about the content of the data cache hierarchy. The data hierarchy, containing L-1s through L-Ys and the LLC can be viewed as a separate cache hierarchy with no inclusion properties imposed upon it. It may for example by non-inclusive.

In the embodiment shown in FIG. 6, each node has one CPU, possibly containing zero, one or many traditional tag-based caches, depicted L0-D and L0-I. Memory requests that cannot be satisfied by any of the traditional L0 caches will generate a lookup in the node's CLB-1 (e.g. 610) in search for a corresponding CLB entry CLT, possibly using a scheme similar to CLB-1 410 in FIG. 4. If a corresponding entry is found in CLB-1, the location information (LI) corresponding to the requested data unit can be located in its CLT field (612). LI identifies a location where the requested data unit can be found. In one embodiment LI residing in the CLB 610 in Node-1 601 can identify either one of the node's own caches (L-1 620 through L-Y 640), the LLC (670), the memory 680, or any of the other nodes (Node-2 690 through Node-N 699) as a location for the data unit it is tracking. In one embodiment, LI can also identify the data unit's location within an identified cache. In one embodiment, the LI can indicate if a data unit resides in any of the traditional caches L0-D or L0-I of a CPU 615 connected to the node.

If a cache location (or memory) is identified as a location where the data can be found, the request can be satisfied by reading that cache directly without consulting a directory (DIR) 660. If a node is identified as the location where the requested data can be found, a request is sent to the CLB-X of that node and the request satisfied similarly to the EXTERNAL REQUESTS discussed for FIG. 4. Still, the directory does not need to be consulted in order to find the data. This is different from most traditional directory-based coherence schemes, where the directory is consulted and updated for accesses that go outside of a node.

Even though FIG. 6 shows one CPU in each node, someone skilled in the art would realize that a node may contain any number (including zero) of CPUs, GPUs, accelerators or other devices that may access memory, such as I/O devices. Furthermore, the configuration and size of CLBs and caches may differ widely between the nodes.

In one embodiment, there is a strict hierarchical search level-by-level in the inclusive CLB/DIR hierarchy. If the location information is not found at a level CLB-i, a lookup is performed at the next level CLB-(i+1). If the location information cannot be found in the nod's highest level (CLB-X), a lookup is performed in DIR. If location information is found at a CLB level or in DIR, a read request can be sent to the data location identified by its corresponding location information at that level and a new CLE entry corresponding to the requested region is created in CLB-1. In one embodiment, the CLB/DIR hierarchy is inclusive. This implies that if there is an CLB entry available at level CLB-L, there has to be an entry installed at level CLB-(L+1). The CLB entry closest to the CPU is active. In one embodiment, there may be inclusion enforced between cache level K (as well as lower cache, i.e., higher up in FIG. 6) and a certain CLB level C (as well as all higher CLB levels, i.e., further down in FIG. 6. As an example, in order for data to be available in any of the caches L-1 620 through L-Y 640, there has to be a corresponding entry in CLB-X 630. If that entry in CLB-X 630 is evicted, all data of the corresponding region should be evicted from caches L-1 620 through L-Y 640. This is referred to as forced eviction. Furthermore, all CLB entries of the same node down to CLB-1 610 also need to be evicted.

It should be noted that there is no inclusion requirement between the cache levels within a node (e.g., caches L-1 620 through L-Y 640) or between LLC 660 and cache in a node (e.g., caches L-1 620 through L-Y 640). For example, valid data corresponding to a specific address may exist in the L1 cache 620, but not in neither cache L-Y 640 nor in the LLC cache 670. This opens up for cache bypass optimizations, where for example streaming data only need to be installed in L1 (actually, only in L0 if it exists) and at no other levels. However, the corresponding CLB entries (which typically is 50 times smaller its corresponding data region) need to be installed at all levels.

The directory (DIR) 660 contains CLB-like information: address tag (AT) 661, Cache Location Table (CLT) and Region Information (RI). While these fields have the same name as the fields of CLBs (e.g., CLB-X 630), the contents of these fields may differ from the corresponding CLB fields. In one embodiment, the RI field 663 of DIR 660 contains N so-called presence bits (PB), indicating which nodes are tracking the region, where N corresponds to the number of nodes in the system. If bit K in the PB is set it implies that there is a corresponding entry in CLB-X of node K. This further implies that there may be cached data in any of the cache levels L1 through L-Y of node K and also that there may be a corresponding entry in CLB-1 in node K, which would enable the CPU in node K to access any cacheline of the corresponding region. While the description refers to an N-bit implementation of the PB information, someone skilled in the art would realize that many scalable techniques used for directory implementation, including but not limited to coarse-grained, limited pointers and linked lists, can be used to implement a similar functionality.

The PB bits can be used to classify regions. A region is classified as a private region (PR) if exactly one of the PB bits of the corresponding entry in the directory 660 is set. Empirical studies show that about 80% on average of all accessed regions are PR regions across a wide selection of studied benchmarks. The region classification PR implies that data of the region may exist only in the one node with its corresponding PB bit set and also guarantees that no other node can access data from the region at this point in time. A node 601 with its PB bit being the only set bit in DIR may be notified that the corresponding region is a private region (PR) and may record the regions classification in its corresponding region information (RI) in its CLB (e.g. in CLB-1 610 through CLB-X 630). PR regions may be accessed efficiently in many respects. For example, no global coherence is needed (i.e., no access to DIR 660 is needed) for the node to gain write permission for a data unit present in the node for which the node currently only has read permission (to upgrade the data unit from state S to state E), since only one node may have caches copies of its data and no other node can access any of the data units of the region. Also movements of data units of a PR region may be implemented efficiently, since data can be moved up and down the entire cache hierarchy (e.g., performing an eviction from L-X to LLC or moving data from LLC to L-1) without the need to inform any structures outside the node. The movement also needs to be recorded in a CLB local to the node (610 through 630). This implies that the CLT information of a PR region stored in the CLBs of the node (610 through 630) may differ (e.g., be more up-to-date) than the CLT information of the region stored in DIR 660.

When a second node (e.g., 690) accesses a PR region (empirical studies show that this is a relatively rare event), it will miss in all its CLBs 691 through 693 and will send a request to DIR 660 to get the appropriate location information LI needed to access the data and also to allow for creations of its own CLB entries in CLB 691 through 693. Since this request is for a PR region, DIR 660 may not have up-to-date information, it needs to get up-to-date location information from node 601 and make sure that CLBs of node 601 no longer marks the region as PR, update its own CLT information for the region, set the PB bit corresponding to Node-2 690 and send appropriate CLB information for the region to node 690. Node-2 690 can now create its own local CLB entries associated with the region. In one embodiment, node 601 has to complete all its ongoing direct-to-data memory requests for the region before sending up-to-date location information to DIR 660.

If yet another node (e.g., Node-N 699) accesses the region, it will also miss in all its CLBs and will also send a request to DIR 660, which now has up-to-date information about the region and can reply with the appropriate information to Node-N 699 and also will set the PB bit of the region for the requesting node (i.e., node 699)

Regions with more than one PB bit set are classified as shared regions (SR). This implies that more than one node have CLBs tracking the location information for this region. It also implies that the nodes with corresponding PB bits set may store data units of the region in any of their caches (e.g., 620 through 640). A request from a CPU (e.g., 615) to access a data unit, which cannot be satisfied locally within the node (e.g., by caches L-1 620 through L-Y 640), may need to initiate a global coherence transaction if the region is classified as SR.

In one embodiment, a global coherent read transaction to an SR or PR region (a read which cannot be satisfied from a local cache (e.g., caches L-1 620 through L-Y 640)) can utilize the location information retrieved from its local CLBs (e.g., CLB-1 610 through CLB-X 630) to access the data directly without involving the DIR 660 or communicating with any nodes other than the node that may be identified by the location information. This is referred to herein as a direct-to-master access. Empirical studies show that 75% of all global coherent transactions to SR regions are direct-to-master read transaction accesses. So, if 20% of the global transactions initiated by CPUs are to SR pages and 75% of those do not need to access DIR, then 95% of the global coherence transactions do not need to access DIR when using cache structures and techniques according to these embodiments, whereas all global coherent transactions need to access DIR for traditional directory-based protocols.

Since SR regions have several nodes tracking the location of its data units, their data unit movements need to be reflected in all nodes tracking the region (i.e., those nodes having an active CLB entry for the region) and the location information of the moved data units is updated in those nodes. In one embodiment, the location information of CLBs of different nodes tracking the data unit should be updated in a coherent manner such that the CLBs agree about where the data resides (referred to as its master location). In one embodiment, it is also guaranteed that a data unit location accessed based on location information retrieved from a CLB contains the correct data (referred to as determinism).

One common reason for such data unit movements is global coherent write requests, i.e., a requesting node that currently does not have write permission to a data unit requests write permission through a global coherent request, for example an invalidation request or an exclusive read request. After the request has completed, the data unit will only reside in the requesting node.

In one embodiment, global coherent write requests are sent by a requesting node (e.g., 601) to the directory 660, which locates the corresponding directory entry, retrieves the corresponding PB bits for the region and forwards a request to all nodes (except the requesting node) which have a corresponding PB bit set, which nodes are referred to as the slave nodes (for example nodes 690 and 699). The slave nodes send ACK messages when they have made sure that any future requests for the data unit originating in the slave node will be directed to the requesting node. This can for example be achieved by changing their location information for the data unit in their CLBs to point to the requesting node (601), which will become the new master node. The ACK messages can either be sent to the DIR 660, which aggregates them and sends an ACK to the requesting node once all ACKs have been received, or sent directly to the requesting node 601. Once the requesting node knows that all ACKs have been received, it has acquired exclusive write permission for the cacheline and completes the request. In one embodiment, a completion message is sent to the DIR 660 upon the completion of the request.

Another common reason for data movement is evictions (also called replacements). Evictions local to a node, for example eviction from L-1 620 to L-Y 640 are handled locally, tracked by its local CLB entries and are not visible outside the node. However, a global eviction of a master data unit, for example from location 641 in L-Y 640 to a new location 671 in LLC 670 must be reflected by all nodes tracking the region (i.e., all nodes with CLB entries for the region). In one embodiment, global eviction is implemented by first copying the value of the data unit stored in its old location (641) to the new location (671), while keeping the data stored in the old location (641) valid. Then, a global coherent eviction request, with information about the new location (671), is sent from the requesting node (e.g., 601) to DIR (660), which forwards a request to the slave nodes (e.g., 690 and 699). Once the slave nodes have updated their corresponding location information to the new location (671) they send an ACK message. Once the requesting node knows that all ACKs have been sent, it has acquired eviction permission for the data unit and can reclaim the old location and the request is completed. In one embodiment, a completion message is sent to DIR 660 upon the completion of the request.

In one embodiment, a slave node does not send ACK messages until some of its outstanding requests (for example all direct-to-master requests) for the requested cacheline have been completed.

In one embodiment, the directory 660 implements a blocking mechanism that ensures that there can be at most one outstanding global request of certain types for each data unit. Examples of such request types could be global coherent write requests and global coherent eviction requests. The blocking for a cacheline ends after the request has been completed, or as otherwise specified by the coherence protocol. The blocking mechanism can be exact, for example implemented by one lock per data unit in the directory, or could be an over-approximation, where addresses hash to a limited pool of locks and that the blocking of a data unit will block accesses for all other data units hashing to the same lock.

In one embodiment, the blocking is done with a region granularity, instead of a data unit granularity, and some of the CLB/directory spill/fill requests also need to block until their updates have been completed. This guarantees that no global coherent write requests are in progress while the nodes and directory spill/fill CLB information.

Another useful region classification is a region with no PB bits associated with the region being set in DIR 660. This implies that the regions data units cannot be present in any of the node's caches L-1 though L-Y and that none of the nodes currently can access its data units. This is referred to as an untracked region (UR). Data of UR regions may still be cached in the LLC. In one embodiment, data units of UR regions can be evicted from LLC 670 without any global coherence requests. A region with no corresponding entry in DIR 660 is classified as a memory region (MR). Data units of MR regions cannot be cached in neither the nodes nor in the LLC. Replacing a CLT entry from DIR 660 implies that all data unites of that region should be forcefully evicted from the LLC.

In one embodiment the cache system of FIG. 6 is a tag-less cache system, i.e., a cache systems where a data unit stored in a cache (for example the caches L-1 through L-Y of the nodes and the LLC) not have an address tag associated with it. Instead, a location information with an address tag associated with it will identify the location where the data unit is stored. The traditional caches included in FIG. 6 (L0-I and L0-D), may still have address tags associated with their cache data units though.

Figure 7:
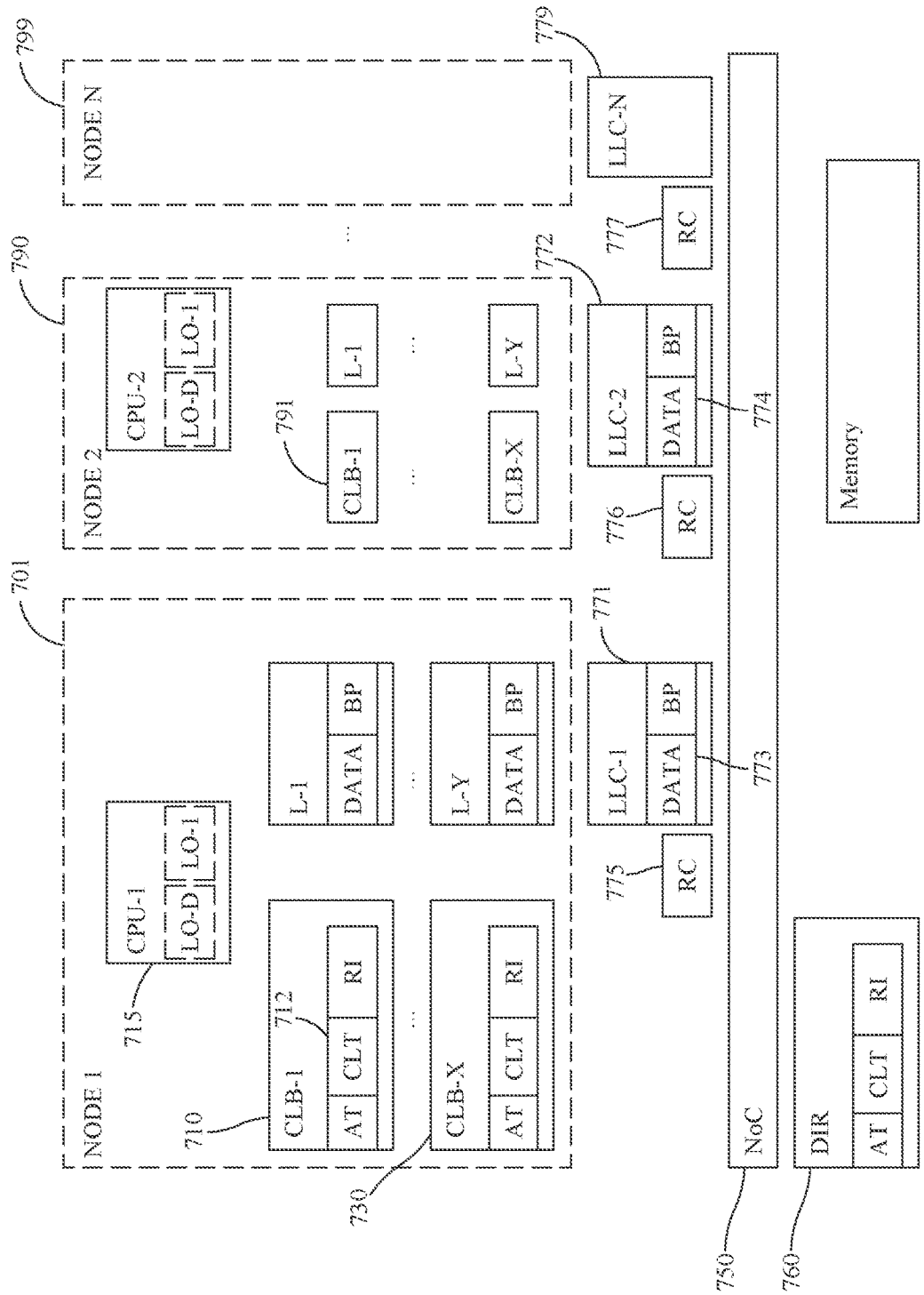
FIG. 7 is a block diagram illustrating a generalized tag-less cache hierarchy with many slices of last level cache according to an embodiment.

FIG. 7 differs from FIG. 6 in that the LLC has been cut up into LLC slices (LLC-1 771, LLC-2 772 and LLC-N 779) and placed on the other side of the network on chip (NoC) 750 close to the nodes. Each of the slices is configured with a replacement counter (RC) 775, 776 and 777 respectively. These counters count the number of cache replacements in each LLC slice. It should be noted that the embodiment of FIG. 7 places the LLC slices outside of each node (represented by the dashed boxes). Even though each LLC slice (e.g., 771) is adjacent to each node and can be accessed with a very short latency from the node's CPU (715), they can still be regarded as a piece of the large global LLC. Evicting a region entry from a CLB-X (e.g., 730) does not necessarily require the corresponding region data residing in the LLC slice close to the node (e.g., 771) to be forcefully evicted. Further, a node (e.g., 701) may store location information in its CLB (e.g., 710) pointing straight to a location in a remote LLC slice adjacent to a remote node (e.g., a location in 772) and may access that data without the need for indirections through neither DIR 760 nor any of the CLBs of that node (790).

There exist LLC implementations today that are reminiscent of FIG. 7 (only in the sense that the LLC is physically divided into banks that are physically placed close to the nodes and not with respect to other elements of FIG. 7). However, solutions today (for example server chips from Intel) place data units in LLC banks according to their address, which results in that 25% of the accesses hitting in an LLC bank will hit in the bank close to the node, assuming four nodes. The cache access technique described according to embodiments, e.g., based on location information pointers, allows full flexibility for placement of the data units and does not depend on the address of a data unit, which potentially could increase the local portion of the LLC hits. One option would be to replicate all the shared data in all the LLC slices where it is accessed. However, replicating all shared data in all LLC slices will consume LLC capacity. As stated before, 20% of regions are typically shared. Assuming that all shared regions will need to be replicated in all nodes, a four-node system would use up 80% of its LLC capacity storing replicated LLC data. This is clearly sub-optimal, prompting for the need for smarter LLC allocation/replication decisions.

When a data unit is first allocated to an LLC slice, it may appear beneficial to always put it in the LLC slice adjacent to the CPU accessing it. However, since the threads running in the different CPUs may have different LLC capacity requirements, it may sometimes be beneficial to place the data unit in a remote LLC slice and thus "steal" some of its local LLC capacity. In one embodiment, the allocation decision is made based on LLC slice cache pressure. Each LLC slice has a replacement counter (RC 775, 776, 777) registering the number of replacements taking place in the slice. In one embodiment, these counters are monitored periodically to determine the cache pressure for each LLC slice, where a higher count indicates a higher pressure. When allocating an LLC space for a data unit, space is always allocated in the local LLC slice if its cache pressure is the lowest. If not, a configurable fraction of its allocations will be made to the remote LLC slice that currently has the lowest pressure, while the remaining allocations are made in the local LLC slice. In one embodiment allocation of space in remote LLC slices will only occur under certain circumstances, e.g., if the cache pressure of the local LLC slice is above a certain threshold.

In a traditional cache topology, where a single last-level cache is shared by several nodes, such as L2 103 in FIG. 1 or LLC 670 of FIG. 6, there is typically at most one copy of each data unit residing in the LLC (referred to as a shared cache) while caches that are private to a node (also referred to as a private cache), such as the L1 caches 102 of FIG. 1, may each store replicated copies of the same data unit. The LLC slices of FIG. 7 have the option of either storing a single copy of a data unit in one of the LLC slices and have all nodes access using identical location information, or storing several so-called replicated copies of a data unit in several LLC slices.

For example a data unit 774 may be the only LLC copy for a data unit and both CLT 712 in CLB-1 710 and a CLT in CLB-1 791 have their associated location information pointing to location 774. This is referred to herein as shared LLC data. After a decision has been made to replicate the data, a copy of the data can be put in location 773 and the associated location information in CLT 712 changed to point to location 773. The data unit stored in 773 is referred to as a local LLC data unit. The local data stored in location 773 can only be accessed indirectly through a lookup in a CLB local to Node 1 701, while the global data stored in location 774 can still be accessed directly by, for example Node N 799, by using location information pointing to location 774.

In one embodiment, access to a remote LLC slice by an instruction miss (e.g., miss in an instruction cache L0-I) can cause the data unit to be replicated and also reside in the LLC slice adjacent to the requesting CPU's node. This is motivated by the fact that a cache miss for an instruction typically results in larger performance degradation than a data miss.

In one embodiment, access to a so-called "hot" data unit in a remote LLC slice can cause the data unit to be replicated and also reside in the LLC slice adjacent to the requesting CPU's node. A hot data unit is a data unit which is accessed frequently. Hot data can for example be detected by measuring the duration since the data was accessed last time. This could for example be implemented by providing "access timestamps" associated with the data unit or associated with the location information. Hot data could also be detected by the cache replacement algorithm, for example LRU or pseudo LRU algorithms, which can detect if a data unit has been accessed recently. In one embodiment, accessed data units that are marked as the most recently used (MRU) data unit of a set are classified as hot data units and cause replication. The inventors' own empirical studies show that intelligent allocation and replication decisions, such as the ones discussed above, can make 80% on average of the LLC accesses hit in the local LLC slice.

In one embodiment, access to a remote LLC slice can cause the data unit to be migrated to the LLC slice adjacent to the requesting CPU's node. The migration decision can be made based on the region's category. For example accesses to private regions can cause a date unit to be migrated to the LLC slice adjacent to the requesting CPU's node. More specifically, instruction accesses, or accesses to hot data, may cause a migration if the accessed region is classified as a private region (PR).

In one embodiment the cache system of FIG. 7 is a tag-less cache system, i.e., a cache systems where a data unit stored in a cache (for example the caches L-1 through L-Y of the nodes and the LLC) not have an address tag associated with it. Instead, a location information with an address tag associated with it will identify the location where the data unit is stored. The traditional caches included in FIG. 7 (L0-I and L0-D), may still have address tags associated with their cache data units though.

Figure 8:
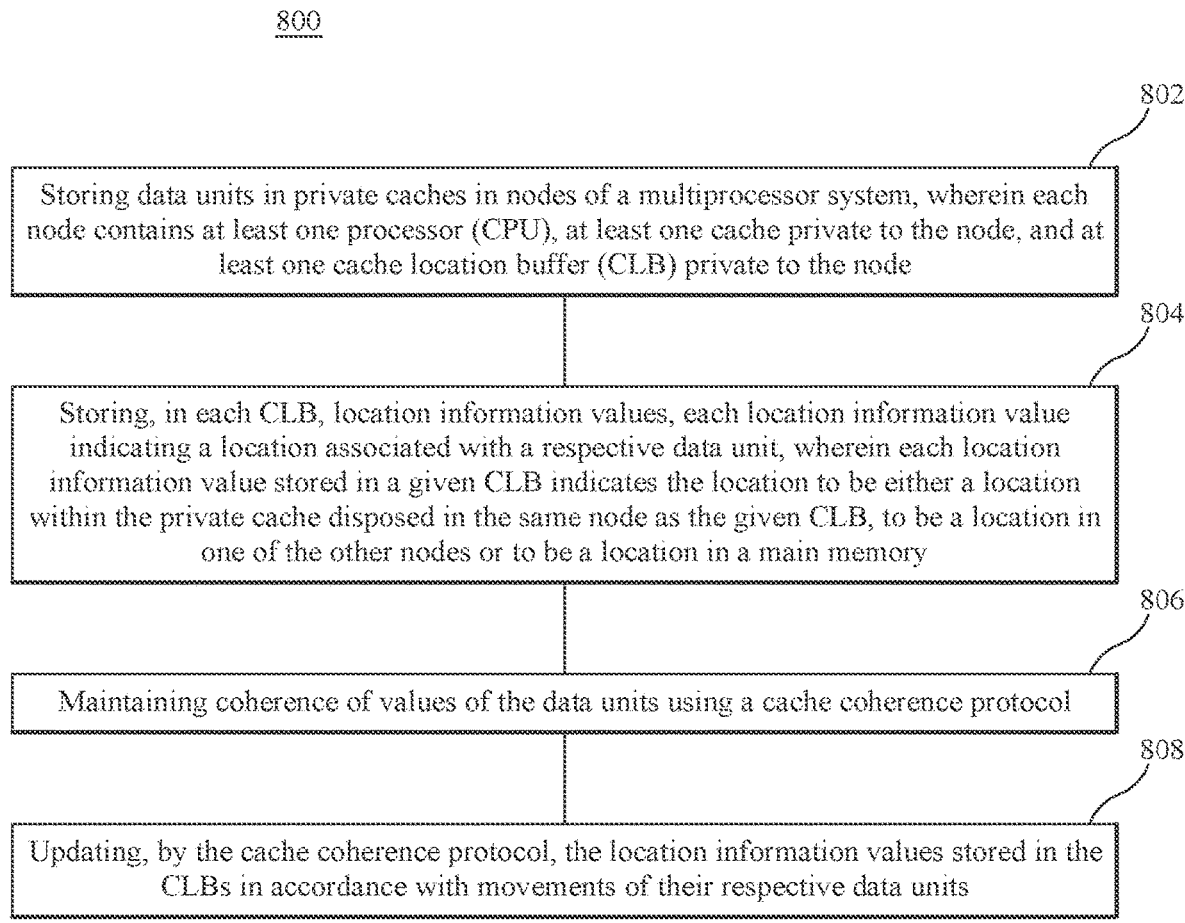
FIG. 8 is a flowchart illustrating a method embodiment.

FIG. 8 illustrates a method embodiment and will be described in detail below, along with other method embodiments.

Operation of the foregoing embodiments may be better understood by referring to practical memory access transactions which will occur in multiprocessor systems which employ such embodiments. For example, FIGS. 9 through 13 describe sequences which can be used by embodiments to maintain certain coherence and determinism between the data cache hierarchy and the CLB hierarchy depicted in FIG. 6. Similar sequences can also be used to keep the coherence and determinism for the multiprocessor system depicted in FIG. 7.

FIGS. 9 through 13 show numbered steps, including communication steps between four different elements identified in FIG. 6, which are represented by blocks at the top of FIGS. 9-13: Specifically, these four different elements include: 1) the requestor node (e.g., 601), which is the node where the activity is started, for example by a request originating inside the node that can not be satisfied locally within that node, 2) the DIR 660, which acts as a backing store (spill/fill) for CLB information stored in the Nodes 1 through N and also takes part in global coherence activities to keep data units coherent, 3) the master location for data units, e.g., location 671 in an LLC 670, and 4) an element collectively representing the "PB nodes" (i.e., the nodes with a corresponding PB bit which is set in the DIR 660 and which corresponds to the data unit being requested, other than the requesting node) also referred to as the slave nodes. Typically, the Requesting is not a slave node and is not considered a PB node even though its corresponding PB bit is set.

The steps taken are described in these embodiments as one numbered sequence, even though someone skilled in the art would realize that some of the steps can be performed in parallel and that there may other possible orders between the steps.

Figure 9:
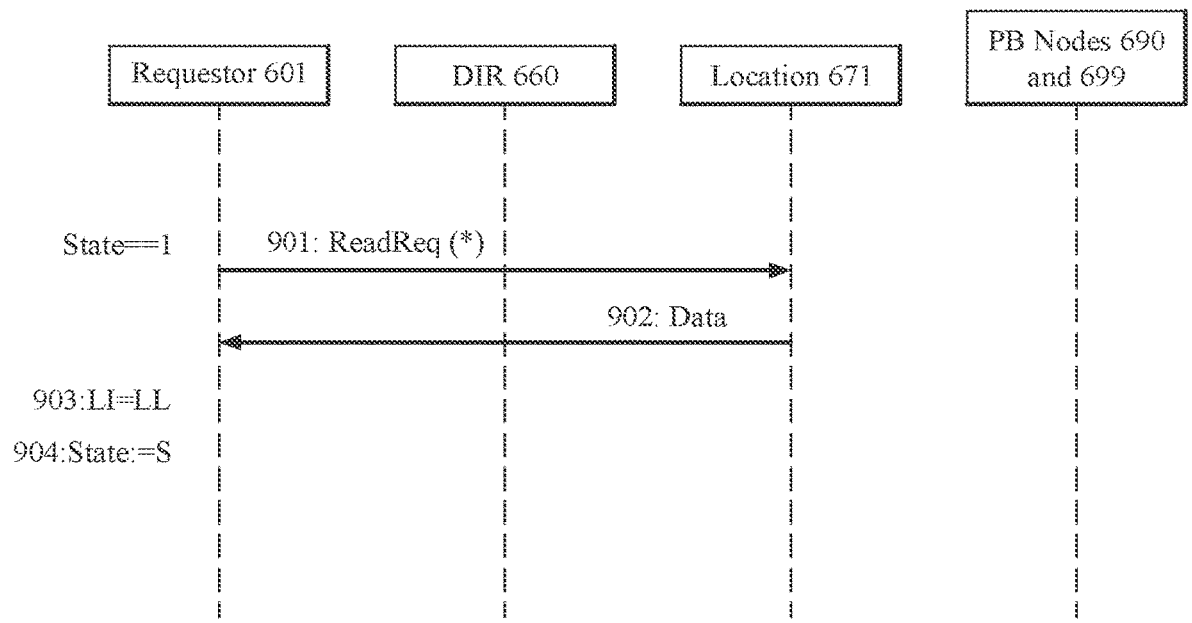
FIGS. 9-13 depict sequences of local and global activities that together implement an integrated coherence protocol for data coherence and CLB coherence according to an embodiment.

Turning to FIG. 9, this Figure depicts global and local steps needed to resolve a global coherent "Read Miss" in combination with a CLB hit in the requesting node 601 according to an embodiment, i.e., a read request initiated in Node-1 601 for a data unit not present in node 601. The master location for the data unit is in location 671 within LLC 670. This example is applicable for both PR and SR regions. The following steps are taken:

Step 901) Node 601 hits in one of its CLBs, determines from the LI that a global read request is needed and utilizes the LI information to form a read request (ReadReq) targeting the data unit's master location 671.

Step 902) The information provided in the ReadReq request is sufficient to find the cache (LLC 670) and the location within it where the data unit resides (671). This results in a data response (Data) being sent back to Node-1 601.

Step 903) Node 601 finds an appropriate local location (LL) within the node, e.g., a free location, a location that can be made free or an otherwise available location, and changes a location information (LI) of a corresponding local CLB entry associated with the data unit to point to that local location.

Step 904) The local location is marked as having state shared (S) to indicate that the copy is readable but notwritable. The master copy for this data unit remains the location 671, which is why no communication is needed (or shown via signal between location 671 and "PB Nodes 690 and 699" block) with neither DIR 660 nor the slave nodes.

Figure 10:
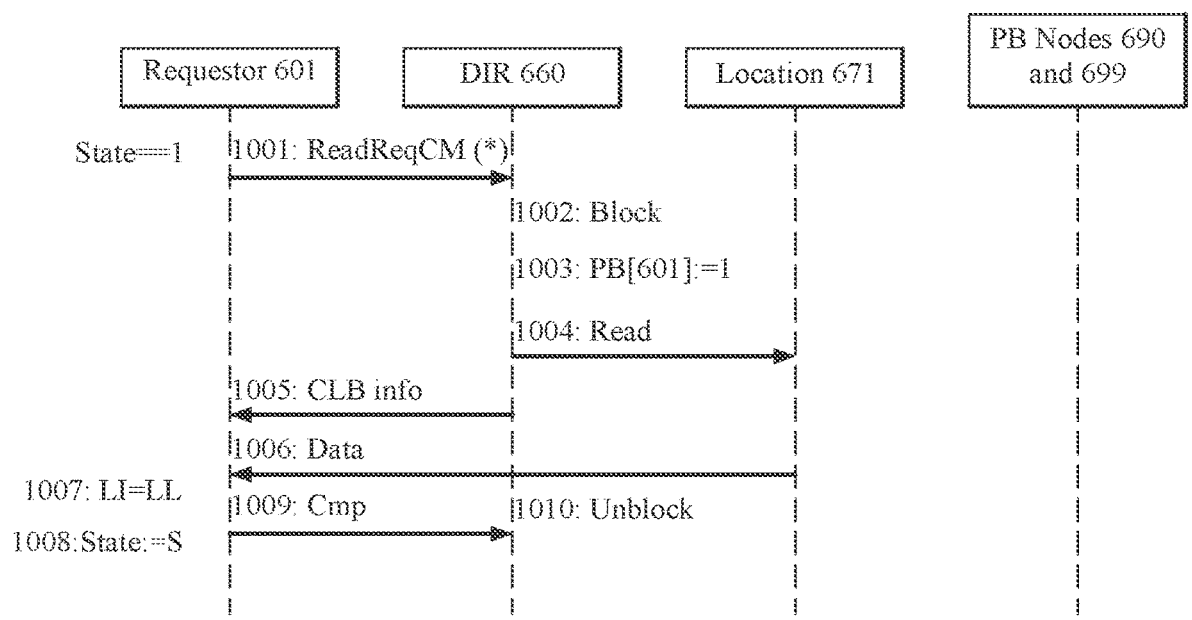

Turning to FIG. 10, this Figure depicts global and local steps needed to resolve a global coherent "Read Miss" in combination with a CLB miss in the requesting node according to an embodiment. This example is applicable for both SR and UR regions (the number of PB bits set in the DIR corresponding to the requested data unit is not equal to 1). The following steps are taken:

Step 1001) Node 601 cannot find a corresponding entry in its local CLBs and forms a Read Request CLB Miss (ReadReqCM) targeting DIR 660.

Step 1002) DIR 660 marks this region as blocked (possibly by taking a lock from a limited hash-lock pool).

Step 1003) DIR 660 sets the PB bit corresponding to Node-601 equal to 1.

Step 1004) DIR 660 determines that the master location is location 671 and sends a read request to that location.

Step 1005) In parallel, DIR 660 sends CLB information to Node 601 to allow it to create a local CLB entry associated with the data unit.

Step 1006) The data is sent from the master location 671 to the requesting node 601.

Step 1007) Node 601 finds an appropriate local location (LL) within the node and changes the local CLB entry to point to that local location.

Step 1008) The local location is marked as state shared (S) to indicate that the copy is readable but notwritable.

Step 1009) The requesting Node 601 sends a completion message (Cmp) to DIR 660.

Step 1010) DIR 660 unblocks the region.

Figure 11:
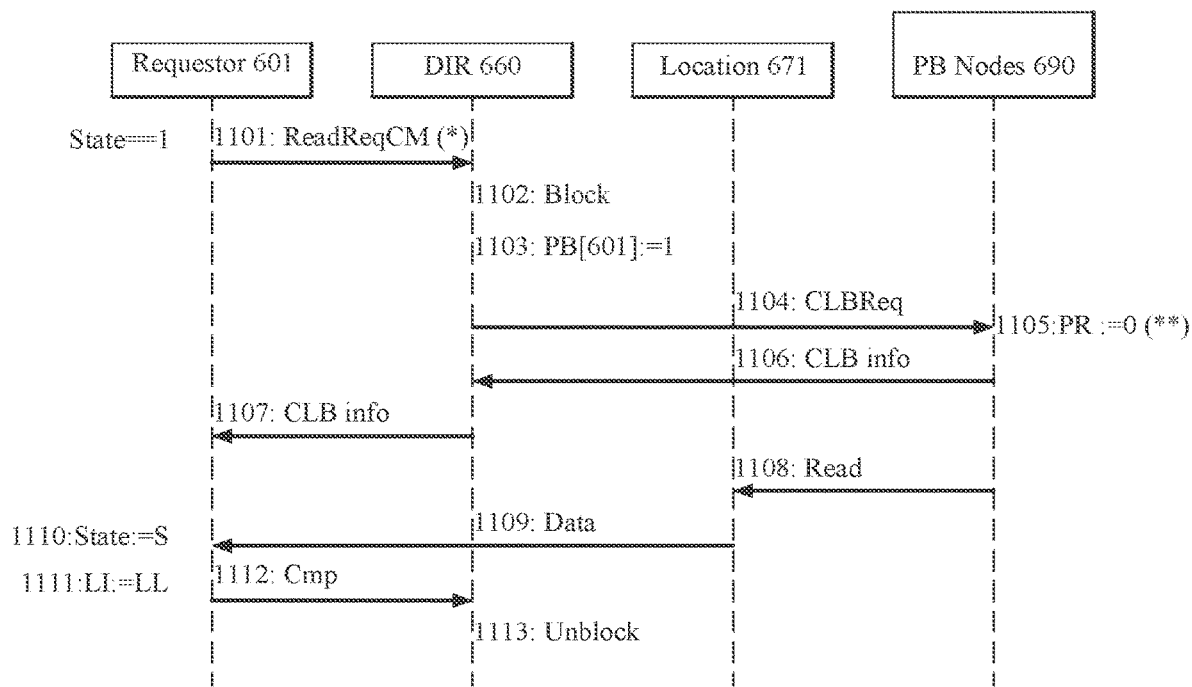

Turning to FIG. 11, this Figure depicts global and local steps needed to resolve a global coherent "Read Miss" in combination with a CLB miss in the requesting node according to an embodiment. This example is applicable for PR regions (the number of PB bits set in the DIR corresponding to the requested data unit is equal to 1). The example assumes that the PB bit is only is set for Node 690. The following steps are taken:

Step 1101) Node 601 cannot find a corresponding entry in its local CLBs and forms a read request CLB-miss (ReadReqCM) targeting DIR 660.

Step 1102) DIR 660 marks this region as blocked.

Step 1103) DIR 660 sets the PB bit corresponding to Node 601.

Step 1104) DIR 660 determines that the region is PR and that it does not have up-to-date CLB information. A CLBReq is sent to Node 690 since that CLB has its corresponding PB bit set in the DIR's RI field 663.

Step 1105) The CLBs of Node 690 clear the region information (RI) indicating the classification PR for the region.

Step 1106) Node 690 replies with CLB information back to DIR 660, once it has completed its outstanding direct-to-data read requests.

Step 1107) DIR 660 forwards CLB information to the requesting Node 601 to allow it to create a local CLB entry associated with the data unit.

Step 1108) Node 690 determines that the master location for the requested data is location 671 and sends a read request to that location.

Step 1109) Data is sent to the requesting Node 601.

Step 1110) Node 601 finds a local location within the node (LL) and changes the local CLB entry to point to that local location.

Step 1111) The local location is marked as state shared (S) to indicate that the copy is readable but not writable.

Step 1112) Node 601 sends a completion message (Cmp) to DIR 660

Step 1113) DIR 660 unblocks the region.

Figure 12:
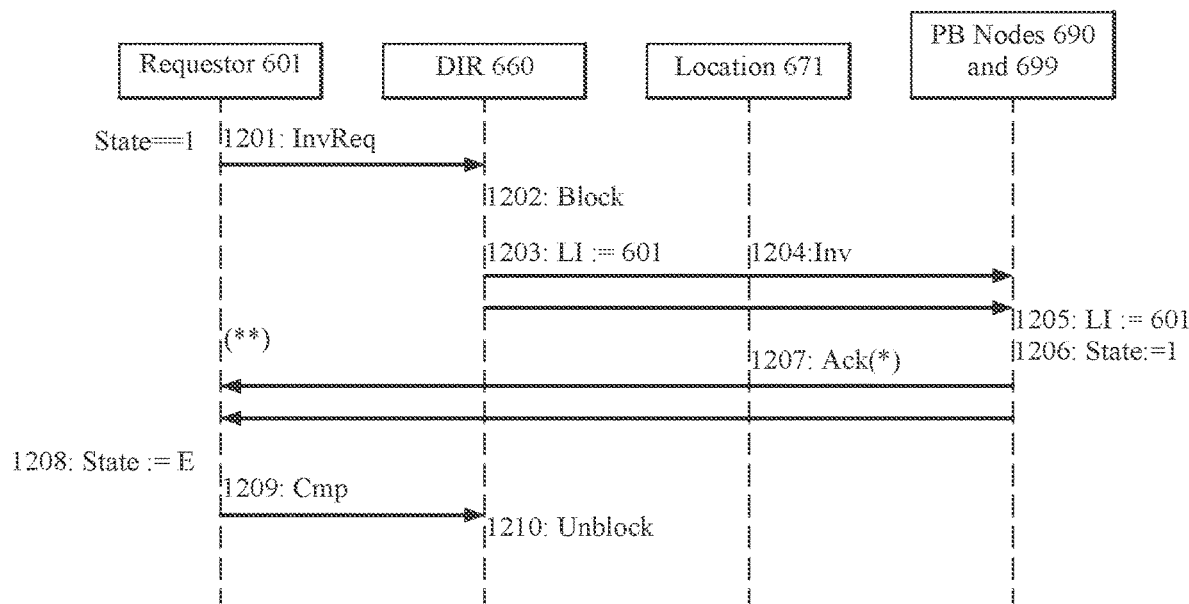

Turning to FIG. 12, this Figure depicts global and local steps needed to resolve a global coherent "Write Upgrade Miss" in combination of a CLB hit in the requesting node according to an embodiment. This example is applicable for SR regions (the number of PB bits set in the DIR for the corresponding data unit is larger than 1). The example assumes that the PB bit is set for Node 690 and Node 699. The following steps are taken:

Step 1201) Node 601 finds a corresponding entry in its local CLBs and determines that it has a local copy of the data unit in state Shared (S) and forms an invalidation request (InvReg) targeting DIR 660.

Step 1202) DIR 660 marks this region as blocked.

Step 1203) DIR 660 sets the LI corresponding to the requested data unit to point to Node 601.

Step 1204) DIR 660 sends invalidation requests (Inv) to both slaves, with their corresponding PB bit set in DIR 660, i.e., nodes 690 and 699.

Step 1205) Both slave nodes (690 and 699) set their LI corresponding to the requested data unit to point to Node 601.

Step 1206) Both slave nodes (690 and 699) make sure that any local copies of the data unit they may have can no longer be accessed (depicted by a state change to invalid state (State:=I).

Step 1207) Both slave nodes (690 and 699) send acknowledge messages to the requesting node (601).

Step 1208) After the requesting node has received all acknowledge messages (the number of messages to receive may be carried by the messages themselves) the copy of the data unit in Node 601 is marked as state exclusive (E) to indicate that the copy is both readable and writable.

Step 1209) Node 601 sends a completion message (CMP) to DIR 660.

Step 1210) DIR 660 unblocks the region.

Figure 13:
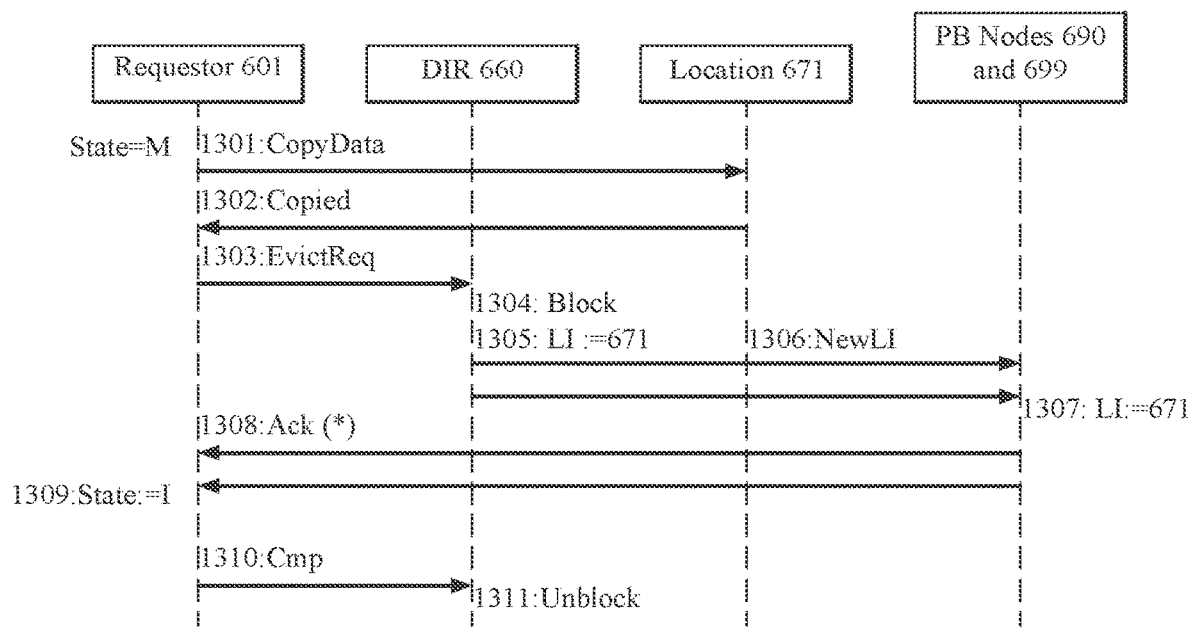

Turning to FIG. 13, this Figure depicts global and local steps needed to resolve a global coherent eviction request from Node 601 according to an embodiment. For example, Node 601 may store a dirty copy of the data unit in its cache L-Y 640 that should be evicted to location 671 in LLC 670. The example assumes that the PB bits which correspond to the relevant data unit in DIR 660 are set for Node 690 and Node 699. The following steps are taken:

Step 1301) Node 601 copies the data value of the data unit to the new location 671 (CopyData).

Step 1302) During this step it is determined that the CopyData operation has reached a point where it can be guaranteed that any ReadReq targeting this data unit will be guaranteed to return the updated copy of the data unit. This may for example be achieved through network ordering properties, by a signal generated internally from the network, or as shown in the embodiment of FIG. 13 by the target location 771 sending a Copied signal back to Node 601 after the CopyData signal has been received.

Step 1303) The requesting node 601 sends a request to evict the data (EvictReq) to DIR 660.

Step 1304) DIR 660 blocks the region.

Step 1305) DIR 660 marks the target location 671 as LI for the data unit.

Step 1306) DIR 660 sends a new location information (NewLI) to both slaves with their corresponding PB bit set in DIR 660, i.e., nodes 690 and 699.

Step 1307) Both slave nodes (690 and 699) set their LI corresponding to the target location 671.

Step 1308) Both slave nodes (690 and 699) send acknowledge messages to the requesting node (601).

Step 1309) After the requesting node has received all acknowledge messages it can free up the space held by the evicted data unit (depicted as State:=I)

Step 1310) Node 601 sends completion message (Cmp) to DIR 660.

Step 1311) DIR 660 unblocks the region.

Ordering Properties

The protocol described above performs three tasks: First, it ensures that LIs stored in several CLBs referring to the same cacheline are in agreement with each other and also ensures determinism, i.e., a direct-to-master access request (for example, ReadReq 901) based on LI information from the CLB of the requestor (for example Requestor 601) is guaranteed to return valid data for the cacheline. Second, it classifies regions that have CLB entries in only one node as private regions (PR) and avoids global coherence (e.g., avoids accesses to DIR 660) for certain accesses requests to these regions. Third, it maintains coherence for the multiple copies of a cacheline that can reside in the caches (e.g., in 620, 692 and 670) by sending global coherence requests (e.g., requests sent to DIR 660).

If certain global coherence requests, as well as some of the actions performed by the coherence protocol in response to those requests, fulfill certain ordering properties, a direct-to-master read request (e.g. 901) sent as a response to a read request from a CPU (e.g., 615) can be consider ordered in the total memory order as soon as its corresponding LI is read from a CLB (610 or 630) of the requesting node (601). This is the case even if the data of the requested cacheline has to be read from a remote node (e.g., 669), from LLC (670) or from memory (680), i.e. even if the request cause a traditional cache miss that may take 100s of cycles to fullfill. The traditional way of ordering read requests is otherwise to consider them ordered when the data for their requested cacheline are returned to the CPU.

Also some write transaction can be consider ordered when their corresponding LI is read from a CLB (610 or 630) of the requesting node (601). In one embodiment, write requests to private regions (PR) finding their corresponding LI in a CLB of the requesting node can be considered ordered in a total memory order when the LI is read from the CLB.

In one embodiment, some transaction not finding the LI in a CLB (610 or 630) of the requesting node (601) are considered ordered when their request sent to DIR 660 (e.g., ReadReqCM 1001 or 1101) has been ordered with respect to request sent to DIR 660 in response to write requests (e.g., InvReq 1201).

Someone skilled in the art would realize that ordering a read or write request early has many advantages. This is especially valuable for requests causing a cache miss, such as a request generated by CPU 615 in node 601 which can not be satisfied by an L1 cache 620 lookup, or slightly worse can not satisfied by an L2 640 lookup, or even worse not even by an LLC 670 lookup requiring an access to the slow memory) already when their corresponding LI is read from a first-level CLB 610 or slightly worse some other level local to the requesting node 601, or even requiring an access to a shared DIR 660 can be orders of magnitude sooner than traditional ways of ordering such requests.

In order to implement certain memory models, such as total store order (TSO), a new read request can not be sent from a CPU until all earlier read requests have been ordered. Also, in certain out-of-order pipeline implementation the CPU can start a speculative read request that returns speculative data before all previous reads have been ordered. The speculative read does not get ordered until all previous reads are ordered and meanwhile speculative data may get invalidated by the coherence protocol causing the speculative read request to be re-executed. This implies that many pipeline resources used by the speculative read can not be freed up until it gets ordered. It also implies that any instruction that utilizes the speculative data may need to be re-executed. In an in-order pipeline the pipeline often needs to be stalled if a read request is not ordered, since there it can not implement re-execution and therefore can neither send out speculative read requests nor start the execution of instructions that uses speculative data.

In one embodiment, the early LI access ordering can be achieved if the global order between two stores (for example two stores to shared regions) that can not be satisfied by accesses to caches local to the requesting node (for example a write request generated in node 601 which can not be satisfied by accesses to caches 620 or 640 and a write request in 690 which can not be satisfied by 692 or 694) need to be observed in the same order by all other CPUs that stores LI information for the two stores.

In one embodiment, this is achieved by first establishing an order between the two writes (e.g., a write A from node 601 happens before a write B from node 690) and second to ensure that coherence transaction (e.g., Inv 1204) sent to PB nodes (e.g., 699) as a response to the two write requests (e.g., Inv Req 1201) will apply their changes (1205) to their respective LIs in that order. The change 1205 associated with write A should change the LI associated with A to store the identity of node 601 (LI:=601) before the change 1205 associated with write B changes the LI associated with B to store the identity of node 690 (LI:=690).

In one embodiment, this is achieved by ordering the two stores in DIR 660 with the effect that coherence transaction sent to the PB nodes (e.g. Inv 1204) are sent to each node in that order, that the communication between DIR and each PB do not reorder these transactions and that that their corresponding LI changes are applied in that order.

A write transaction being ordered early implies that the next write transaction from the same Requesting node (601) can be started, even if the previous write has not been performed (the value of the cacheline has not changed), while Total Store Order (TSO) can still be guaranteed.

In one embodiment, an additional ORDERED transaction (not shown in FIG. 12) is sent to the Requestor 601 to from the DIR in addition to the Inv transaction (1214). The ordering requirement of the ORDERED transaction is the same requirement for the Inv transactions 1214 discussed in the embodiments above. The write request in the requesting node cannot be considered ordered and the write cannot be performed before the ORDERED transaction has been received by the Requestor. In one embodiment, the write request can be considered ordered as soon as the ORDERED transaction has been received, but the write can not be performed to before all the anticipated Ack transactions 1207 have been received.

In one embodiment, a write transaction initiated by a CPU (615) to a private region (PR) can be considered ordered as soon as its associated LI has been read from a CLB (610 or 630) local to the Requesting node (601).

The advantages of ordering a read or write request early include, but are not limited to, giving an indication to an out-of-order pipeline that the request itself will not cause a so-called rollback (i.e., requiring the instruction generating the request and all later instructions to get squashed) which could allow for early release of resources associated with the instruction (reorder buffer (ROB) entries, physical registers etc.) The early ordering of requests can also allow an in-order stall-on-usage pipeline the ability to launch new read or write instruction, even though an earlier instruction has caused a cache miss. Even if the new instructions also cause cached misses, the instructions following them can get launched. Allowing a stricter memory model (such as TSO or sequential consistency) the advantage of issuing more instructions while there are older instructions causing a cache miss that have not been resolved (e.g., data has not been returned for a read instruction or write permission has not been granted for a write instruction).

In one embodiment, a fairly simple pipeline can start new read instructions as soon as all earlier read instructions are ordered, but before all of them have received data. Each register has a valid bit associated with them. An instruction dependent on a register that not yet contains valid data is parked while new instructions are allowed to execute. Parked instructions are woken up when the corresponding register receives valid data. Instructions executed after a speculated branch instruction will not be marked as valid until it has been determined that the speculated behavior of the branch indeed was correct. The valid bit controlled by the branch may be different from the valid bit set when data is written to the register.

If the branch was miss-speculated, the program counter changed to re-execute the branch instruction and all instructions after it.

It can be noted that DIR 660 sends Inv messages to all nodes with valid CLB entries in step 1204 of FIG. 12. This could potentially result in more Inv messages sent than for a conventional directory-based coherence protocols that send Inv messages only to nodes that are known to have read the requested data unit. In one embodiment, this effect is tamed by a technique known as CLB weeding, where some CLB entries are evicted if it is detected that the node receives unnecessary Inv messages. For example, a CLB entry can be evicted if none of the data units of the corresponding region resides in the node's caches and Inv messages are received for the region. It has been empirically shown by the inventors that in spite of the potential of sending more Inv messages, the overall number of messages sent by the proposed system in the embodiment are less than half of the number of messages sent by conventional directory-base coherent systems.

In one embodiment, if a region is still detected to generate too many coherent messages due to the PB bit representation in DIR, the region could be converted to a special classification known as fine-grain regions (FR). FR regions (that are expected to be very few) have special entries in DIR that can tracks the set of nodes that have shared copies associated with each cacheline, possibly using a directory representation technique, such as fully mapped, DirN-B, DirN-NB or coarse-grained representation. The region's CLB entries will be marked as FR regions and will initially have their location entries set to the symbol "don't know" (DK). This will prompt global coherence read requests to consult DIR to find the location of a data unit, which will allow DIR to track the node as having a shared copies associated with the requested data unit. This information allows DIR to send Inv messages only to the nodes that have requested the cacheline.

In one embodiment, the nodes store PB bits as part of the region information (RI) in their CLB entries (e.g., 610 through 630). This enables a node requesting coherent write permission to send invalidation requests directly to the slaves, rather than making an indirect access through the directory.

Cache coherence protocols of multiprocessor systems can be greatly simplified if a blocking mechanism, such as the mechanism described in conjunction with DIR 660, is provided. However, there are situations where direct communication between the nodes are preferred over indirections through the directory, for example some embodiments where PB bits are stored as part of the region information (RI) in the of the nodes CLBs allowing for invalidation messages to be send directly between the nodes without the need for a directory lookup. It would be beneficial to have a blocking mechanism decoupled from a directory. This would not just save the extra directory lookup latency and energy; it could potentially lead to fewer NoC transactions sent and fewer crossings of clock domains.

In one embodiment, the network implements a blocking functionality that blocks certain messages from being sent on the network. This may be implemented by an array of locks integrated in the network, where a part of the address associated with a message is used to select the lock corresponding to the message. The corresponding lock may be acquired (lock gets set) when a message of certain types is sent on the network. While the lock remains acquired, other messages of certain types are blocked from being sent on the network. The lock will need to be released by some event specified by the coherence protocol before, blocked messages associated with the lock may be sent A message acquiring a lock may be of broadcast type, implying that there may be more than one node receiving the message. In one embodiment, one or more nodes receiving the message need to take action (as specified by a coherence protocol) to release the associated lock before blocked messages may be sent. In one embodiment, the sending node gets notified when the lock gets released.

In one embodiment, a single write request initiated by a requesting node may generate an invalidation broadcast message sent to several slave nodes, which will cause a lock to be acquired. Each of the slave nodes invalidates their data unit and applies a release mechanism to the lock. Once all slave nodes have applied their release mechanism, the lock gets released and the requesting node gets notified and will be granted write permission. This should be compared with a traditional directory-based coherence system, where a write request initiated in a node will involve the following steps: a write request is sent to the directory; the directory locks and sends invalidation messages to slaves nodes; the slave nodes invalidate data units and send Ack messages; the requesting node detects when all Acks have been received and gets write permission; the lock is unlocked in the directory.

The mechanisms described herein have many significant differences compared with conventional directory-based coherent cache memory systems built with conventional tag-based caches. Embodiments have been described which have one or more of the following unique properties:

1) Cache locations information, identifying where readable copies of a data units can be found, are cached in so-called cached location buffers (CLBs) close to the CPUs.

2) The CLBs form a separate inclusive "CLB cache hierarchy", with the directory DIR at its root, storing "metadata" information about where the data units are stored in the separate "data cache hierarchy". This is different from conventional caches that store address tag "metadata" associated with each cacheline to identify its identity and thus need to search each level for the data unit requested. CLBs+DIR are organized and searched in a hierarchical manner.

3) Data caches of the "data cache hierarchy" do not need to be organized and searched in a hierarchical manner, as is common for conventional cache.

4) The directory tracks nodes that may have copies of cachelines of a region (or may access the region) using "PB bits". This information is used to steer some coherent messages, for example invalidation messages (Inv). This is different from conventional directories than track the set of nodes that may have shared copies associated with each cacheline.

5) Private regions are detected, where only one node may access, and may have cached copies of, the region's data units.

These features enable several unique properties not present in conventional directory-based coherent memory systems:

80% of global coherent requests do not need to take coherence into account since it can be guaranteed that only one node may access the data and may have cache copies of the data accessed, e.g., due to characteristic (5) above.

Global coherent read requests do not need to consult the directory, because the locally cached location information can tell where the data is located, e.g., due to characteristic (1) above, and that tracks the set of nodes that may have shared copies associated with each cacheline, e.g., due to characteristic (4) above The LLC is divided into LLC slices, where the allocation of data units to LLC slices can be done freely and do not depend on the address of the data unit, e.g., due to characteristic (1) above. LLC slices are placed close to the nodes and smart heuristics is used to increase the likelihood that a node will access data units in its LLC slice.

Read accesses can find a requested data unit in such a local LLC, e.g., due to characteristic (1) above, (1) slice without the need to consult the directory, e.g., due to characteristic (4) above Empirical studies performed by the inventors have shown that the proposed techniques reduce the number of global NoC messages, the amount of data sent across the NoC and the total energy used all by more than 50% on average across a wide set of applications, while cutting the average latency for L1 misses by 30% on average.

From the foregoing embodiments, various general features of the embodiments can be noted. These features can be used together in some embodiments, or in various combinations and subcombinations in other embodiments. For example, a cache location buffer (CLB) is used to track the location of cache lines in a multiprocessor cache hierarchy. The cache hierarchy may include one or many caches of different sizes and/or access times. Each cache can store a plurality of cache lines stored in an associative way, for example, divided into a number of sets, each containing a number of ways. While the address identifying a cache line can be used to identify a set within a cache where the cache line should reside, the identity of its way location cannot be determined by its address without a search.

One task of the CLB according to some embodiments is to efficiently find the cache and the location within that cache level which stores a specific cache line, the node storing that cacheline or to efficiently determine that the cache line does not reside in the cache hierarchy at all. In this context, "efficiently" may refer to using less energy, operating more quickly, using less storage space, some combination thereof, or other beneficial results.

A CLB may be implemented according to some embodiments as an associative structure, storing a plurality of cache table entries (CTE). Each such entry stores, for example, an address tag and location information for the group of cache lines that are identifies by that CTE. The CLB may be implemented in a hierarchical manner with smaller and faster CLBs backed by larger but slower CLBs. The different CLB levels can be designed to be accessed using virtual or physical addresses.

The location of a requested cache line is determined by a lookup in the CLB, after which the cache line can be accessed at its determined level and location without the need for any other associative lookups. This removes the requirement to store additional address tags in the cache hierarchy.

Numerous variations and permutations of the above embodiments are contemplated. For example, in one embodiment the number of location information bits associated with a CTE may be different for different CLB levels and the copying of LI information between the CLB levels may be partial copying operations. In another embodiment, the functionality of a first-level CLB is integrated with the functionality of a TLB or contains parts of the functionality commonly found in TLBs. In an example of such an implementation, a CLB entry could contain some combination of virtual address tag (VAT), cache location table (CLT), access permission encodings and physical address translation, as well as other metadata commonly found in TLB implementations. Moreover, even though the examples above contain up to two cache levels and up to two CLB levels, those skilled in the art will understand that the techniques described herein can be generalized to apply to more levels of caches and more levels of CLB. There is no requirement that the number of cache levels and the number of CLB levels are the same. It will also be understood that the last level of CLB may spill and fill to a dedicated region in traditional (main) memory and that way act as a CLB cache.

In one embodiment, the information of a CTE may contain other metadata associated with its associated cachelines, including but not limited to, information about their access patterns and past usage, cacheline state, protection information normally stored in a TLB and the physical address portion needed to generate a physical address. Some of this data may be stored in the region information (RI) fields of for example 413 and 425.

The embodiments can also be expressed as methods, an example of which is provided as method 800 in the flowchart of FIG. 8. Therein, at step 802, data units are stored in private caches in nodes of a multiprocessor system, wherein each node contains at least one processor (CPU), at least one cache private to the node and at least one cache location buffer (CLB) private to the node. At step 804, in each CLB, location information values are stored, each location information value indicating a location associated with a respective data unit, wherein each location information value stored in a given CLB indicates the location to be either; location within the private cache disposed in the same node as the given CLB, to be a location in one of the other nodes, or to be a location in a main memory. Coherence of values of the data units are maintained using a cache coherence protocol at step 806. The location information values stored in the CLBs are updated by the cache coherence protocol in accordance with movements of their respective data units.

Figure 14:
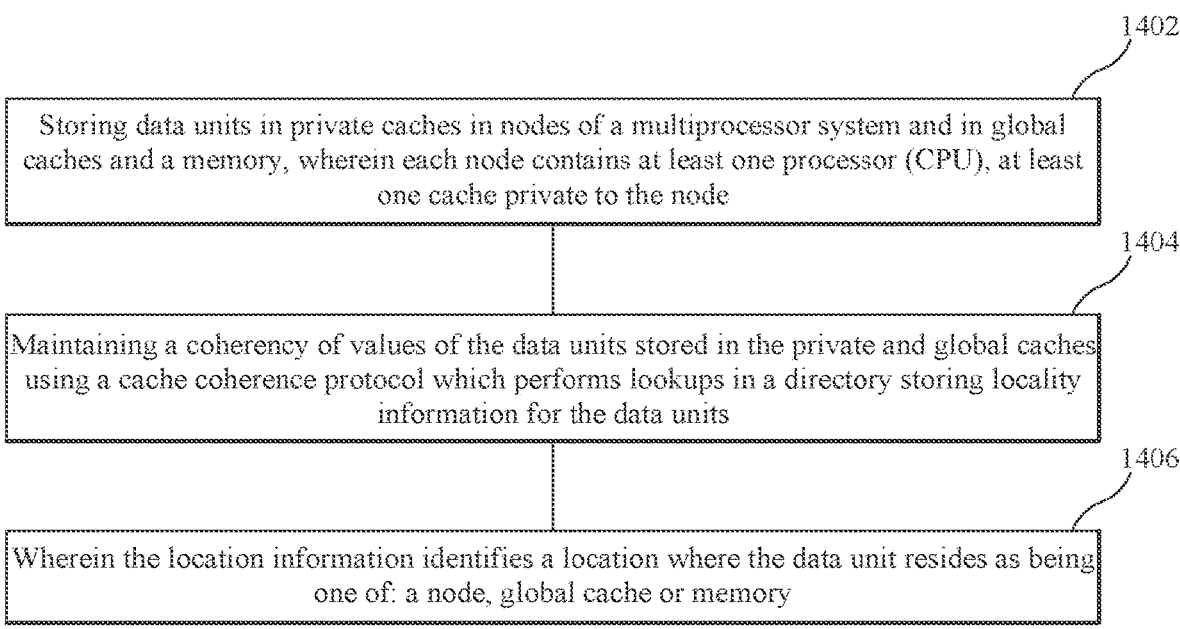
FIGS. 14-15 are flowcharts illustrating method embodiments.

According to another method embodiment, illustrated in the flowchart of FIG. 14, a method 1400 includes storing data units in private caches in nodes of a multiprocessor system and in global caches and a memory, wherein each node contains at least one processor (CPU), at least one cache private to the node at step 1402 Coherency of values of the data units stored in the private and global caches are maintained, at step 1404, using a cache coherence protocol which performs lookups in a directory storing locality information for the data units. The location information identifies a location where the data unit resides as being one of: a node, a global cache or memory as indicated by step 1406.

Figure 15:
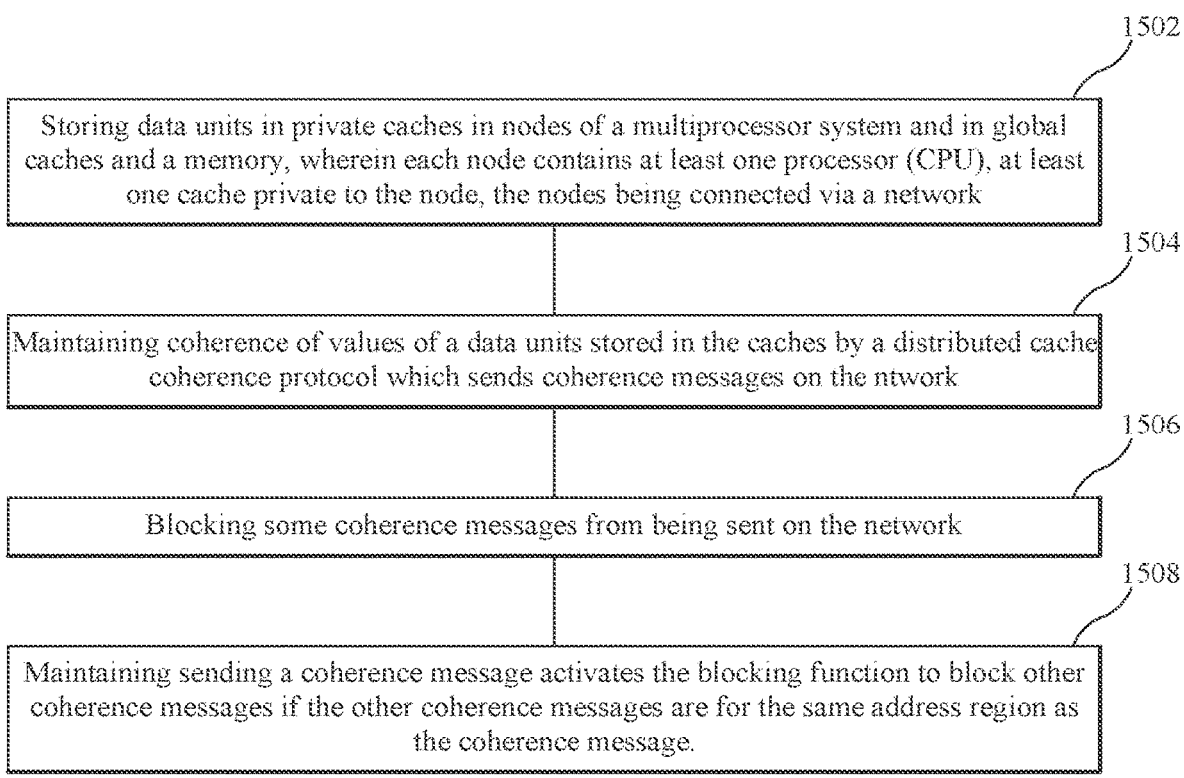

According to another method embodiment, illustrated in FIG. 15, a method 1500 includes, at step 1502, data units being stored in private caches in nodes of a multiprocessor system and in global caches and a memory, wherein each node contains at least one processor (CPU), at least one cache private to the node, the nodes being connected via a network. Coherence of values of data units stored in the caches is maintained, at step 1504, by a distributed cache coherence protocol which sends coherence messages on the network. Some coherence messages are blocked from being sent on the network, step 1506, wherein sending a coherence message activates the blocking function to block other coherence messages if the other coherence messages are for the same address region as the coherence message (shown as step 1508).

The steps depicted in FIGS. 8, 14 and 15 can be performed in various orders and some steps can be performed in parallel or sequentially. These method embodiments, the system embodiments described above, and other embodiments may provide various beneficial results. For example, Applicants have performed detailed simulation studies which have shown that cache implementations associated with the embodiments described herein can save substantial energy compared with conventional cache systems and can also result in caches with substantially shorter access time.

For clarity, most descriptions herein generally describe techniques for how a cacheline is located and returned to a requesting CPU. The descriptions do not describe in detail the various ways in which a requested word contained within the cacheline is selected and returned to the CPU, which will be apparent to those skilled in the art and would have unnecessarily obscured the invention.

For clarity, most descriptions herein describing the handling of data of cache hierarchies describe exclusive cache hierarchies. Those skilled in the art would understand that the described embodiments can be extended to also cover inclusive memory hierarchies and non-exclusive memory hierarchies.

Although described above in the context of certain exemplary computer architectures, caching exists in many other settings within, as well as outside, a computer system and the foregoing embodiments are equally applicable to such other contexts. An example of such usages is the virtual memory system which caches data from a slow, high-capacity storage, such as a disk or FLASH memories, into a faster and smaller high-capacity memory that could be implemented using dynamic RAM. Other examples of caching in a computer system include, but are not limited to, disk caching, web caching and name caching. The organization and caching mechanisms of such caches may vary from those of the caches discussed above, e.g., variances in the size of a set, their implementation of sets and associativity, etc. Regardless of the implementation of the caching mechanism itself, the embodiments described herein are equally applicable for implementing the various caching schemes.

The disclosed embodiments describe, for example, systems and methods associated with various cache hierarchies. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A multiprocessor system comprising:
    a plurality of nodes, a network on chip (NoC), a directory (DIR), a global last level cache (LLC) and at least one memory, wherein each node contains at least one processor, a first cache, a second cache private to the node, and a first cache location buffer (CLB) private to the node,
    wherein the first CLB stores a plurality of first CLB entries, each of the first CLB entries includes an address tag field and a cache location table (CLT), which includes a plurality of location information values with the address tag field, each location information value indicating a location associated with a respective data unit,
    wherein the location information values are used to search a target cache line from the first cache or the second cache,
    wherein the NoC is configured to connect the DIR, the LLC, and at least the memory to the nodes,
    wherein the DIR is configured to include region information comprised of first presence bits indicating which node is tracking location information of a target cache line,
    wherein the DIR is configured such that, in response to a request sent by a first node from among the plurality of nodes, the DIR sends a request associated with a global coherence operation to one or more nodes from among the plurality of nodes, based on the first presence bits,
    wherein at least a second node from among the plurality of nodes is configured to send a request associated with a global coherence operation to one or more nodes from among the plurality of nodes based on second presence bits included in a CLB private to the second node.

2. The multiprocessor system of claim 1, wherein the first cache of at least one node from among the plurality of nodes has a level hierarchy different from that of the second cache of the at least one node.

3. The multiprocessor system of claim 1,
    wherein the at least one processor of at least one node among the plurality of nodes is equally accessible to the first cache and the second cache of the at least one node to search the target cache line using the location information value corresponding to the target cache line.

4. The multiprocessor system of claim 3,
    wherein the at least one processor of the at least one node acquires a data unit of the target cache line from the first cache when the target cache line is stored in the first cache as a result of the search.

5. The multiprocessor system of claim 1,
    wherein the first cache and the second cache of at least one node from among the plurality of nodes store a plurality of cache entries, and each cache entry includes a backward pointer for updating the first CLB of the at least one node and a cache line including a data unit.

6. The multiprocessor system of claim 5, further comprising a second cache location buffer (CLB) private to the at least one node,
    wherein the second CLB of the at least one node stores a plurality of second CLB entries, each of the second CLB entries including a CLT and a pointer to the first CLB of the at least one node.

7. The multiprocessor system of claim 6,
    wherein the backward pointer points to at least one of the second CLB entries,
    wherein the pointer of the pointed second CLB entry points to the first CLB entry that includes the CLT corresponding to the CLT of the pointed second CLB entry.

8. The multiprocessor system of claim 7,
    wherein the at least one processor of the at least one node updates the location information value for the target cache line using the first CLB of the at least one node when any one of the first CLB entries is pointed by the pointer.

9. The multiprocessor system of claim 1,
    wherein the at least one processor of at least one node from among the plurality of nodes acquires the location information value corresponding to the target cache line by matching an address corresponding to the target cache line with the first CLB entries of the first CLB of the at least one node.

10. The multiprocessor system of claim 1,
    when a target node corresponding to the first presence bits among the nodes is one, the global coherence operation is performed for the target cache line in the target node through the DIR.

11. The multiprocessor system of claim 1,
    wherein when a plurality of target nodes corresponding to the first presence bits among the plurality of nodes are present, the global coherence operation is performed for the target cache line in the target nodes through the DIR.

12. The multiprocessor system of claim 1,
    wherein when there is no target node corresponding to the first presence bits among the plurality of nodes, the target cache line is cached to the LLC or evicted from the LLC.

13. The multiprocessor system of claim 1,
wherein the DIR and the first cache location buffer of each of the nodes are configured as a data cache hierarchy.

14. The multiprocessor system of claim 13,
wherein the DIR is further configured to include an address tag cache location table, and
wherein the first cache location buffer of each of the nodes is a highest cache location buffer and when location information for the target cache line in the first cache location buffer is not found,
the DIR is used to find the location information for the target cache line based on the address tag cache location table.

15. A data management method of a multiprocessor system including a plurality of nodes and at least one memory, each node including at least one processor, a first cache, a second cache private to the node, and a first cache location buffer (CLB) private to the node, the method comprising:
performing a matching operation based on an address associated with a target cache line and a plurality of first CLB entries stored in the first CLB of a first node, from among the plurality of nodes,
each of the plurality of first CLB entries of the first CLB of the first node including an address tag field, a cache location table (CLT) that includes a plurality of location information values associated with the address tag field,
each location information value being capable of identifying, as a location of a data unit corresponding to the location information value, any one of,
the first cache of the first node,
the second cache of the first node,
the at least one memory, and
a node, from among the plurality of nodes, other than the first node; and
acquiring a target data unit corresponding to the target cache line based on a result of the matching operation,
the acquiring including, based on location information of the first CLB of the first node identifying a second node as a location of the target data unit, sending a request for the target data unit from the first node to a CLB of the second node.

16. The method of claim 15, wherein the matching operation comprises:
comparing a tag portion of the address with the address tag fields of the plurality of first CLB entries; and
acquiring a location information value corresponding to the target cache line from a first CLB entry, from among the plurality of first CLB entries, that includes an address tag field that matches the tag portion of the address.

17. The method of claim 16, wherein the acquiring the location information value comprises:
selecting, from among the plurality of location information values included in the CLT of the first CLB entry that includes the matched address tag field, a location information value corresponding to the matched address tag field, by using an offset portion of the address.

18. The method of claim 15, wherein the acquiring the target data unit further includes, based on location information of the first CLB of the first node identifying the first cache of the first node or the second cache of the first node as a location of the target data unit,
accessing the first cache of the first node or the second cache of the first node; and
searching for the target data unit among data units stored in the first or second cache of the first node using a location information value corresponding to the target cache line and an index portion of the address.

19. The method of claim 15, further comprising:
determining whether to update a first entry, from among the plurality of first CLB entries, based on whether the first entry is an active entry, when updating location information values for data units stored in the first cache or the second cache.

20. The method of claim 19,
wherein the first and second cache of the first node each store a plurality of cache entries, and each cache entry stored in each of the first and second caches of the first node includes,
a backward pointer for updating the first CLB of the first node, and
a cache line including a data unit.

* * * * *